(12) United States Patent
Emura et al.

(10) Patent No.: US 10,279,741 B2
(45) Date of Patent: May 7, 2019

(54) DISPLAY CONTROL APPARATUS, METHOD, RECORDING MEDIUM, AND VEHICLE

(71) Applicant: Panasonic Intellectual Property Management Co., Ltd., Osaka (JP)

(72) Inventors: Koichi Emura, Kanagawa (JP); Yuko Arai, Tokyo (JP); Makoto Mochizuki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 599 days.

(21) Appl. No.: 14/507,874

(22) Filed: Oct. 7, 2014

(65) Prior Publication Data
US 2015/0103174 A1 Apr. 16, 2015

(30) Foreign Application Priority Data
Oct. 10, 2013 (JP) ................................. 2013-213141

(51) Int. Cl.
*H04N 7/18* (2006.01)
*B60R 1/00* (2006.01)
*G06K 9/00* (2006.01)

(52) U.S. Cl.
CPC ............ *B60R 1/00* (2013.01); *G06K 9/00805* (2013.01); *B60R 2300/307* (2013.01);
(Continued)

(58) Field of Classification Search
CPC ........ B60R 2300/307; B60R 2300/308; B60R 2300/8033; B60R 2300/8093
(Continued)

(56) References Cited

U.S. PATENT DOCUMENTS 6,226,389 B1 5/2001 Lemelson et al.
8,085,140 B2 * 12/2011 Mochizuki ............ B60W 40/02
340/435
(Continued)

FOREIGN PATENT DOCUMENTS

CN 104081763 10/2014
EP 2256667 12/2010
(Continued)

OTHER PUBLICATIONS

The Extended European Search Report dated Feb. 18, 2015 for the related European Patent Application No. 14188482.5.
(Continued)

*Primary Examiner* — Jeremiah C Hallenbeck-Huber
(74) *Attorney, Agent, or Firm* — Greenblum & Bernstein, P.L.C.

(57) ABSTRACT

A method capable of causing a driver to recognize multiple objects to which attention should be paid without requiring sight line shift of the driver is for a video system including a recognition unit that recognizes a moving body existing in a foreground of a user and a display source that displays a certain image generated on the basis of a result of the recognition by the recognition unit on a display medium. The method includes determining whether two or more moving bodies exist in the foreground of the user on the basis of an input data from the recognition unit; and controlling the display source, if two or more moving bodies exist, so as to generate the certain image representing a virtual line directed to each of the moving bodies from a certain position or a certain axis and display the certain image on the display medium.

15 Claims, 17 Drawing Sheets

(52) U.S. Cl.
CPC . *B60R 2300/308* (2013.01); *B60R 2300/8033* (2013.01); *B60R 2300/8093* (2013.01); *H04N 7/18* (2013.01)

(58) Field of Classification Search
USPC ........................................................ 348/148
See application file for complete search history.

(56) References Cited

U.S. PATENT DOCUMENTS

| | | | | |
|---|---|---|---|---|
| 8,970,451 | B2* | 3/2015 | Nagasawa | B60K 35/00 345/7 |
| 2005/0159893 | A1* | 7/2005 | Isaji | G01S 17/023 701/301 |
| 2008/0273750 | A1* | 11/2008 | Fujimoto | G06K 9/00362 382/103 |
| 2009/0022368 | A1* | 1/2009 | Matsuoka | B60K 35/00 382/103 |
| 2009/0128311 | A1* | 5/2009 | Nishimura | G06K 9/00845 340/435 |
| 2009/0231116 | A1* | 9/2009 | Takahashi | B60K 35/00 340/461 |
| 2010/0305755 | A1 | 12/2010 | Heracles | |
| 2011/0255747 | A1* | 10/2011 | Iwasaki | G06K 9/00348 382/103 |
| 2012/0133769 | A1* | 5/2012 | Nagamine | B60R 1/00 348/148 |
| 2012/0140072 | A1* | 6/2012 | Murashita | G06K 9/00805 348/148 |
| 2012/0200705 | A1* | 8/2012 | Saigusa | G06T 7/2053 348/148 |
| 2012/0314074 | A1* | 12/2012 | Aimura | G06K 9/00362 348/148 |
| 2013/0176329 | A1* | 7/2013 | Toyoda | G06T 11/60 345/593 |
| 2013/0249684 | A1* | 9/2013 | Hatakeyama | B60K 35/00 340/435 |
| 2013/0314221 | A1* | 11/2013 | Taylor | G06T 7/174 340/435 |
| 2014/0063248 | A1* | 3/2014 | Sakagami | G08G 1/166 348/148 |
| 2014/0104313 | A1* | 4/2014 | Matsumoto | G06K 9/00369 345/632 |
| 2014/0176350 | A1* | 6/2014 | Niehsen | B62D 15/025 340/988 |

FOREIGN PATENT DOCUMENTS

| | | |
|---|---|---|
| EP | 2578464 | 4/2013 |
| JP | 2002-025000 | 1/2002 |
| JP | 2008-009843 | 1/2008 |
| JP | 2008-062762 | 3/2008 |
| JP | 2008-176566 A | 7/2008 |
| JP | 2009-009446 A | 1/2009 |
| JP | 2011-008772 | 1/2011 |
| WO | 2013/108371 | 7/2013 |

OTHER PUBLICATIONS

Hye Sun Park et al., "In-Vehicle AR-HUD System to Provide Driving-Safety Information", ETRI Journal, vol. 35, No. 6, Dec. 2013.

* cited by examiner

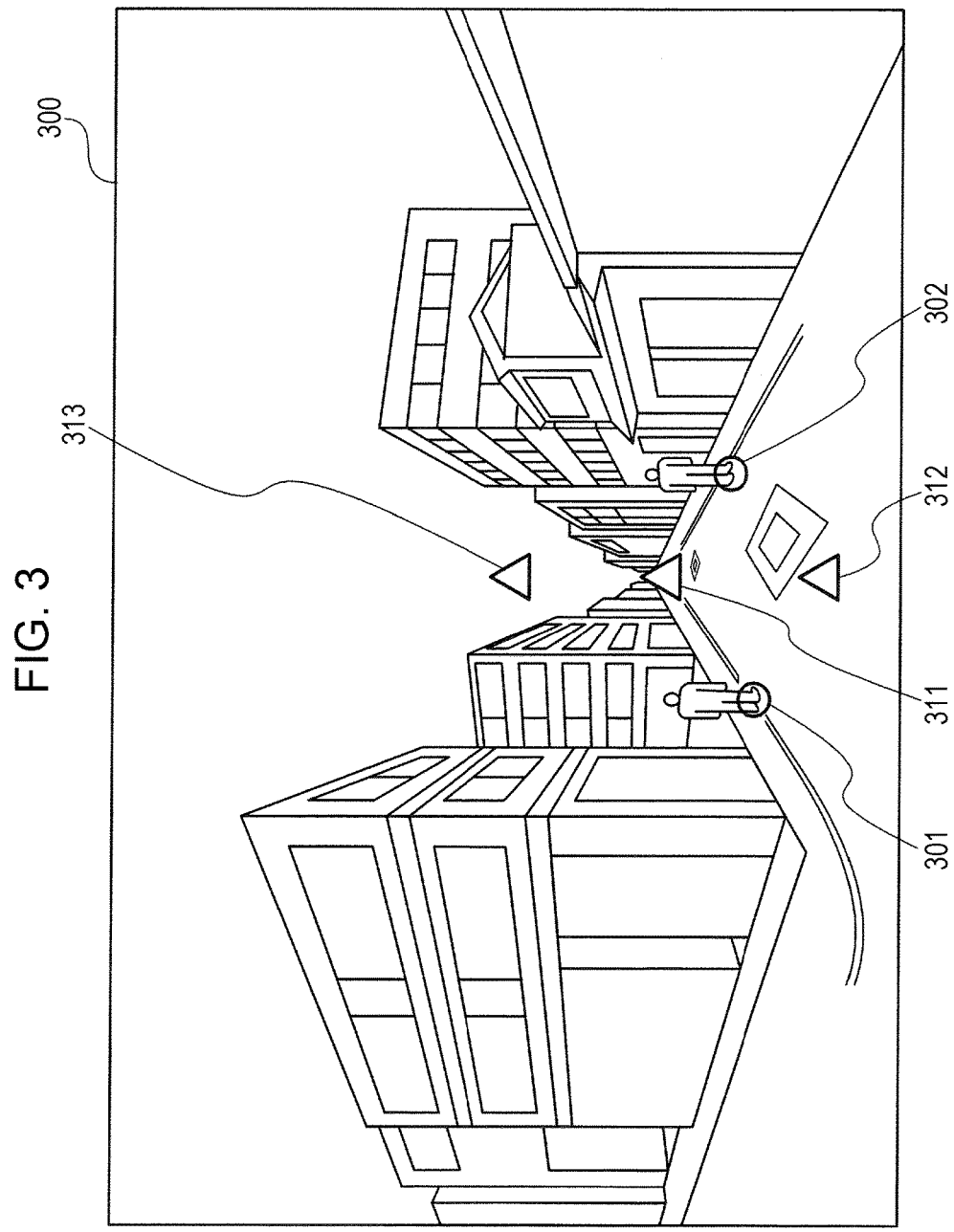

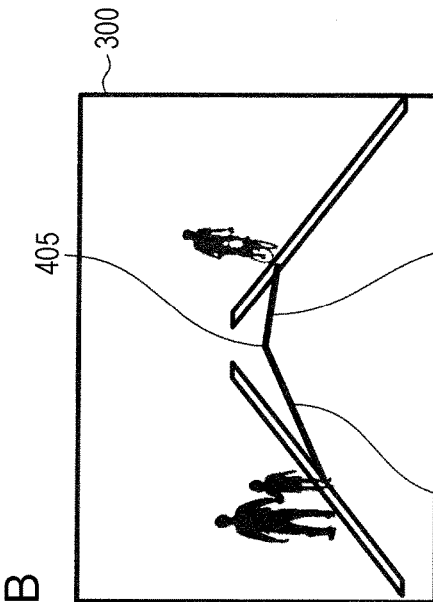
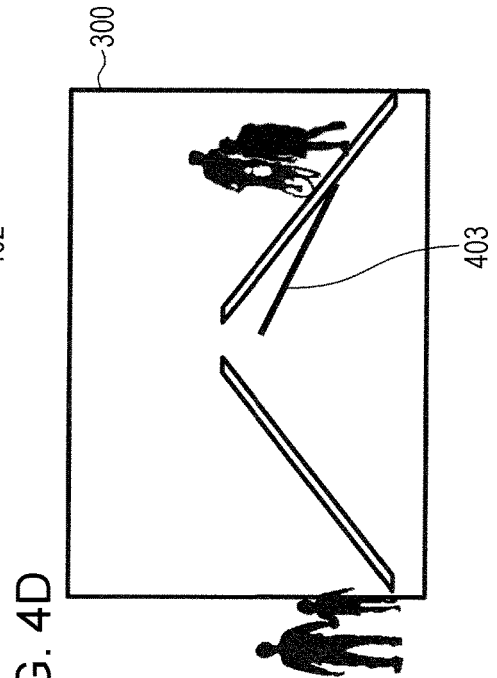
FIG. 4A
FIG. 4B
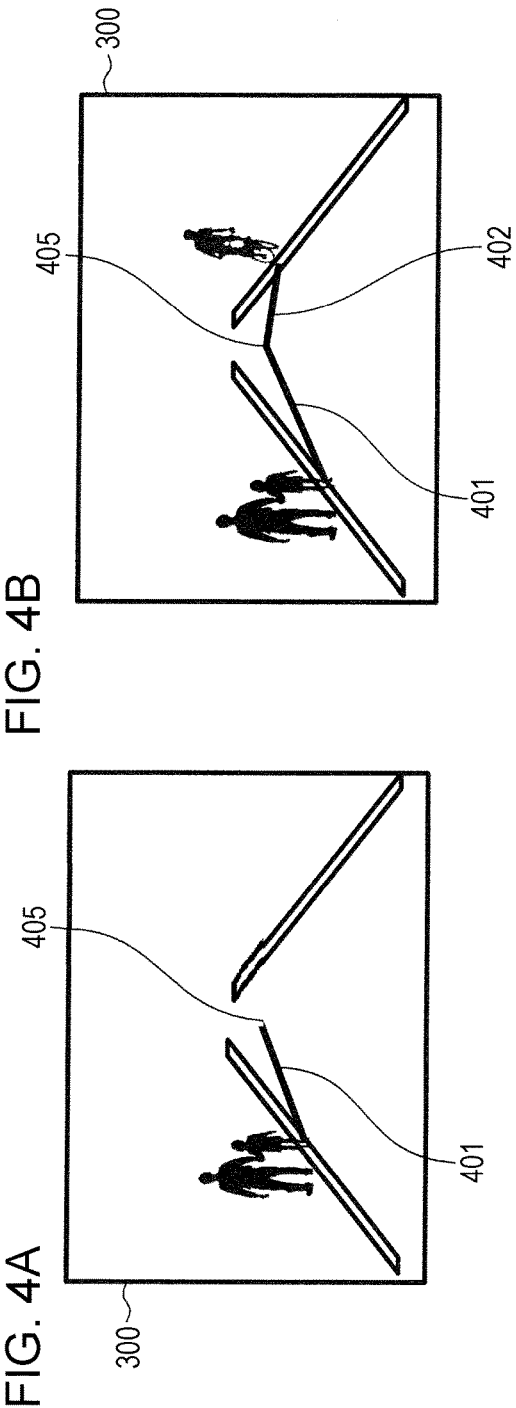
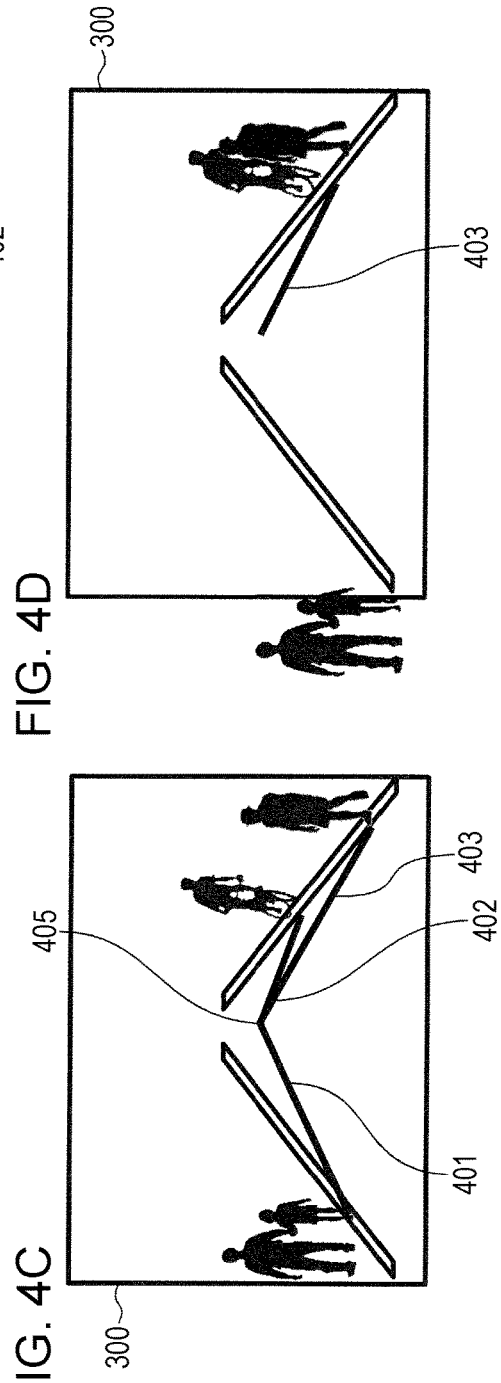
FIG. 4C
FIG. 4D

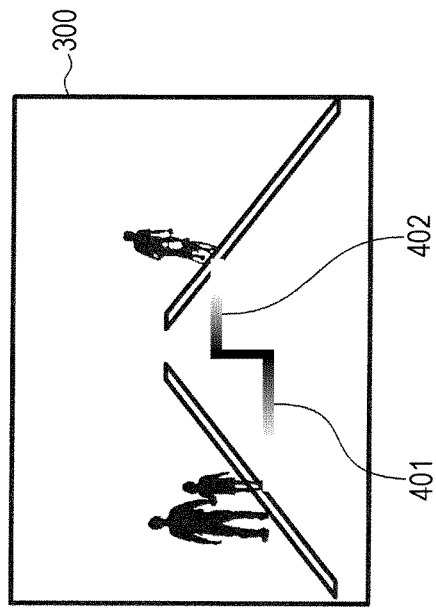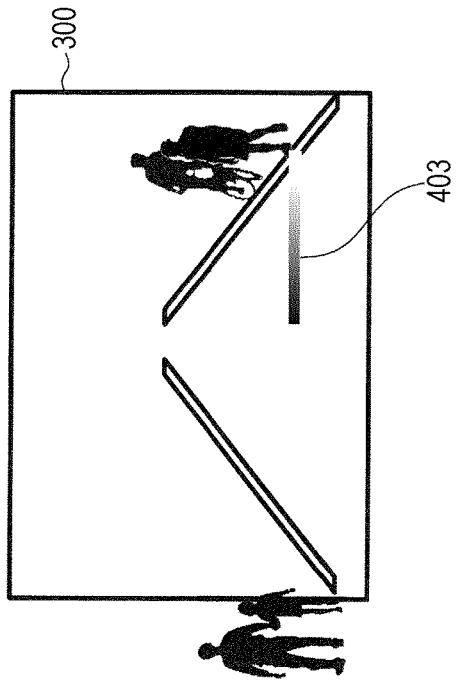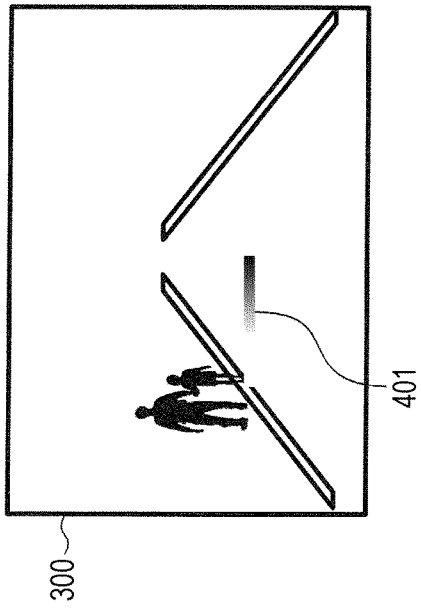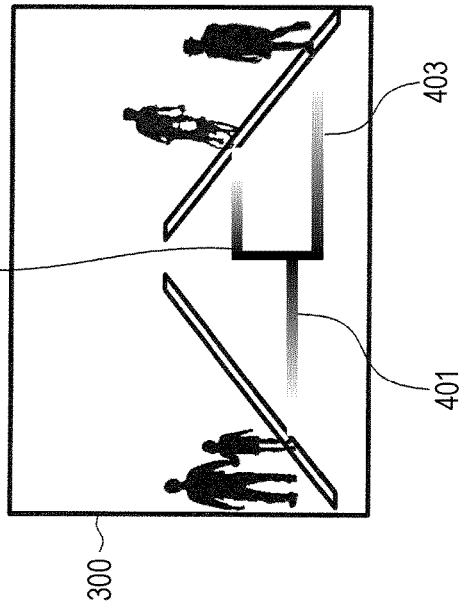

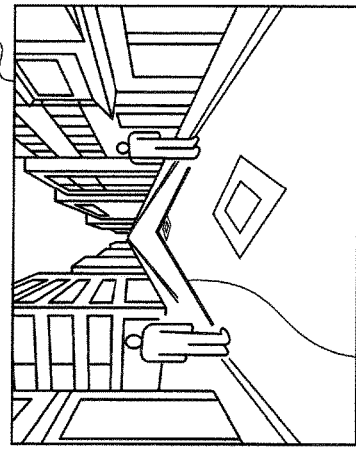
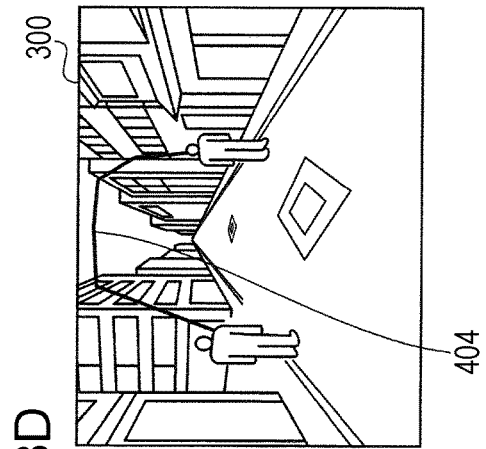
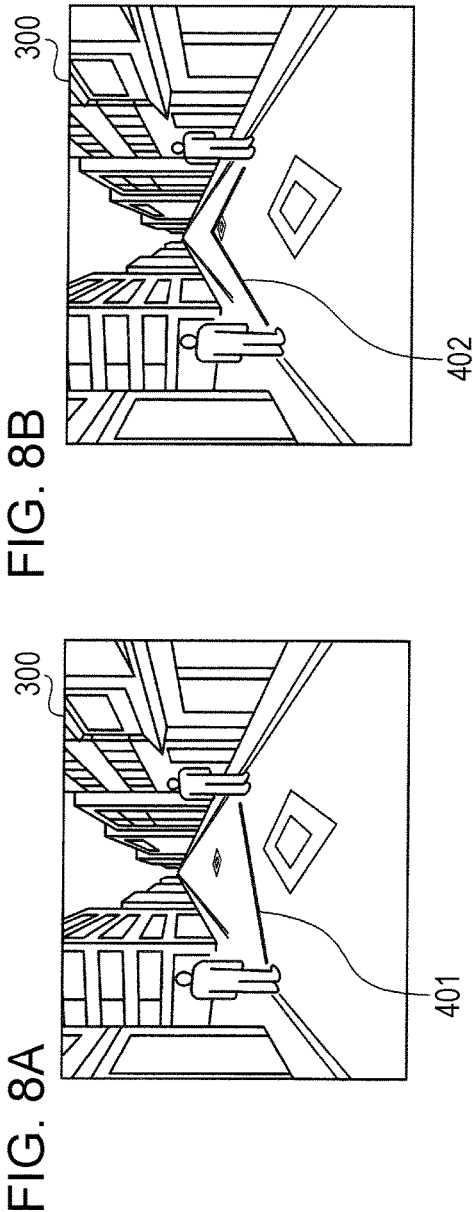
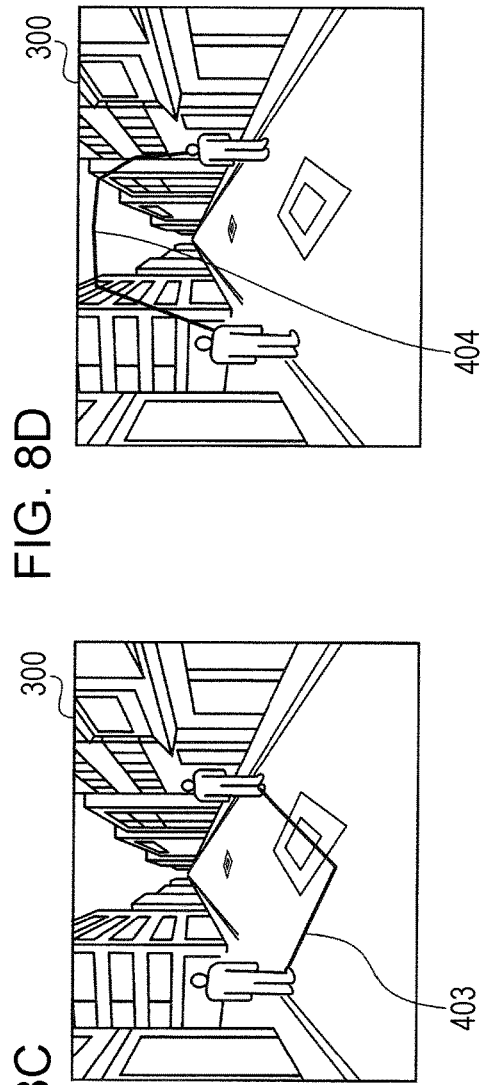

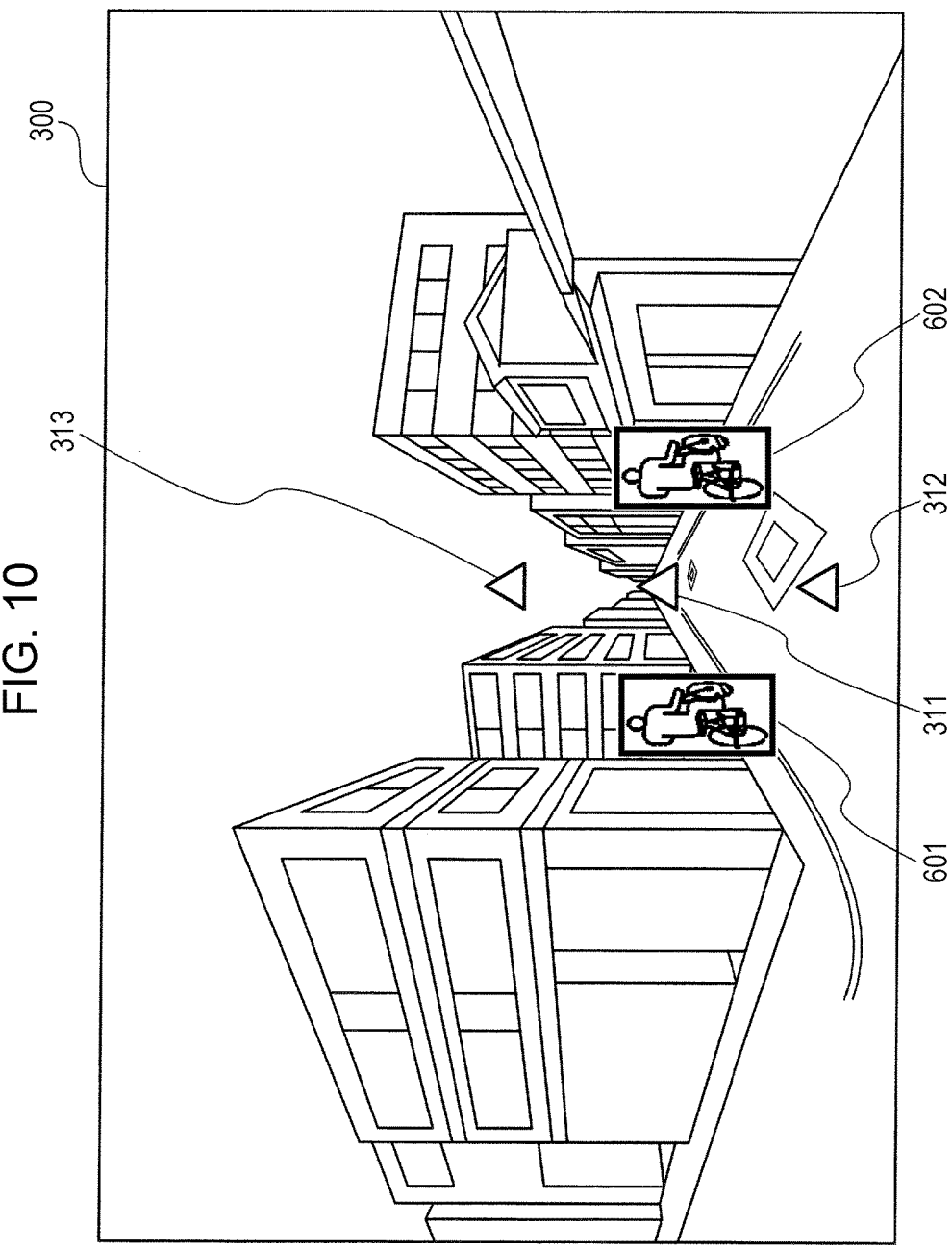

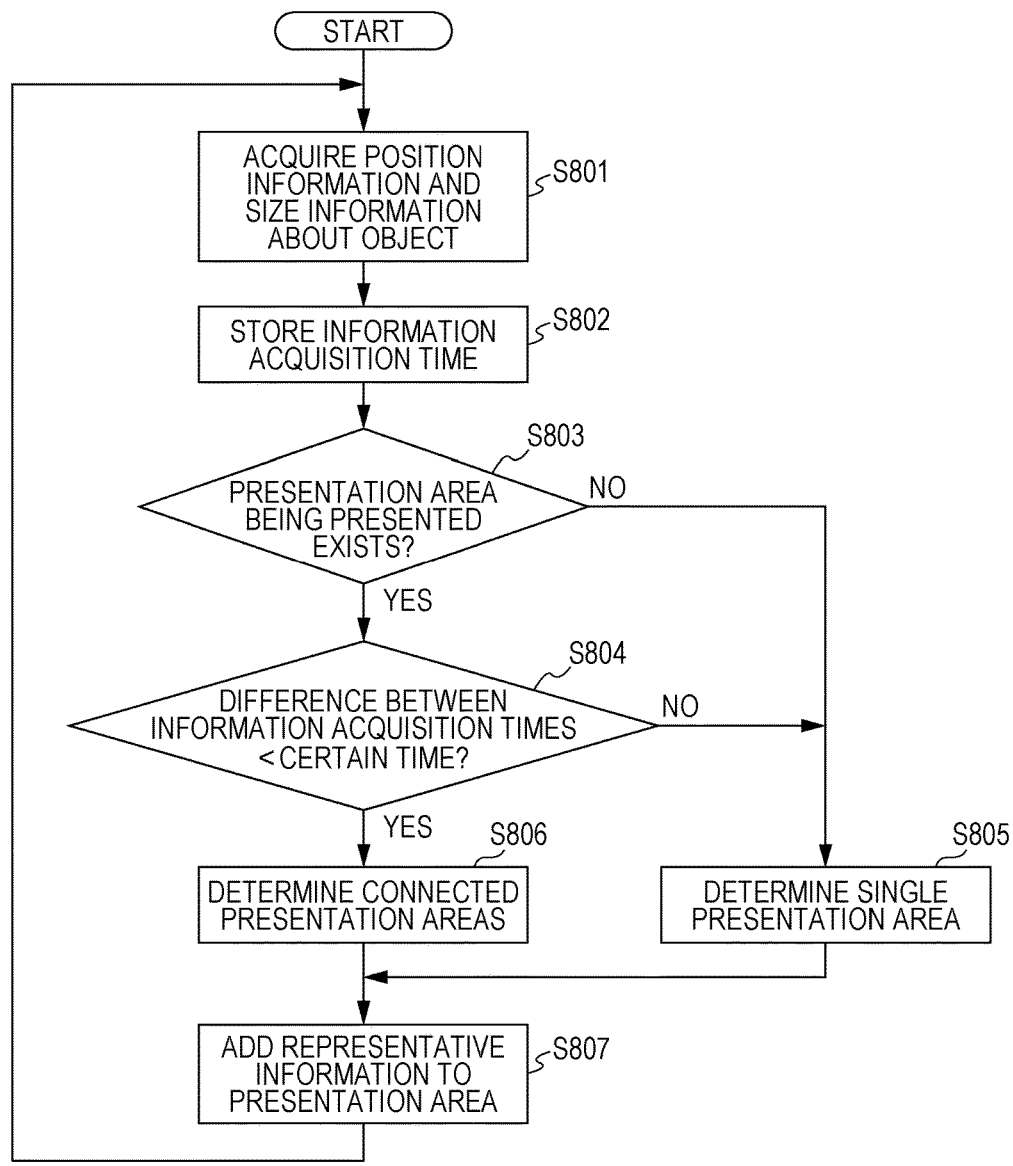

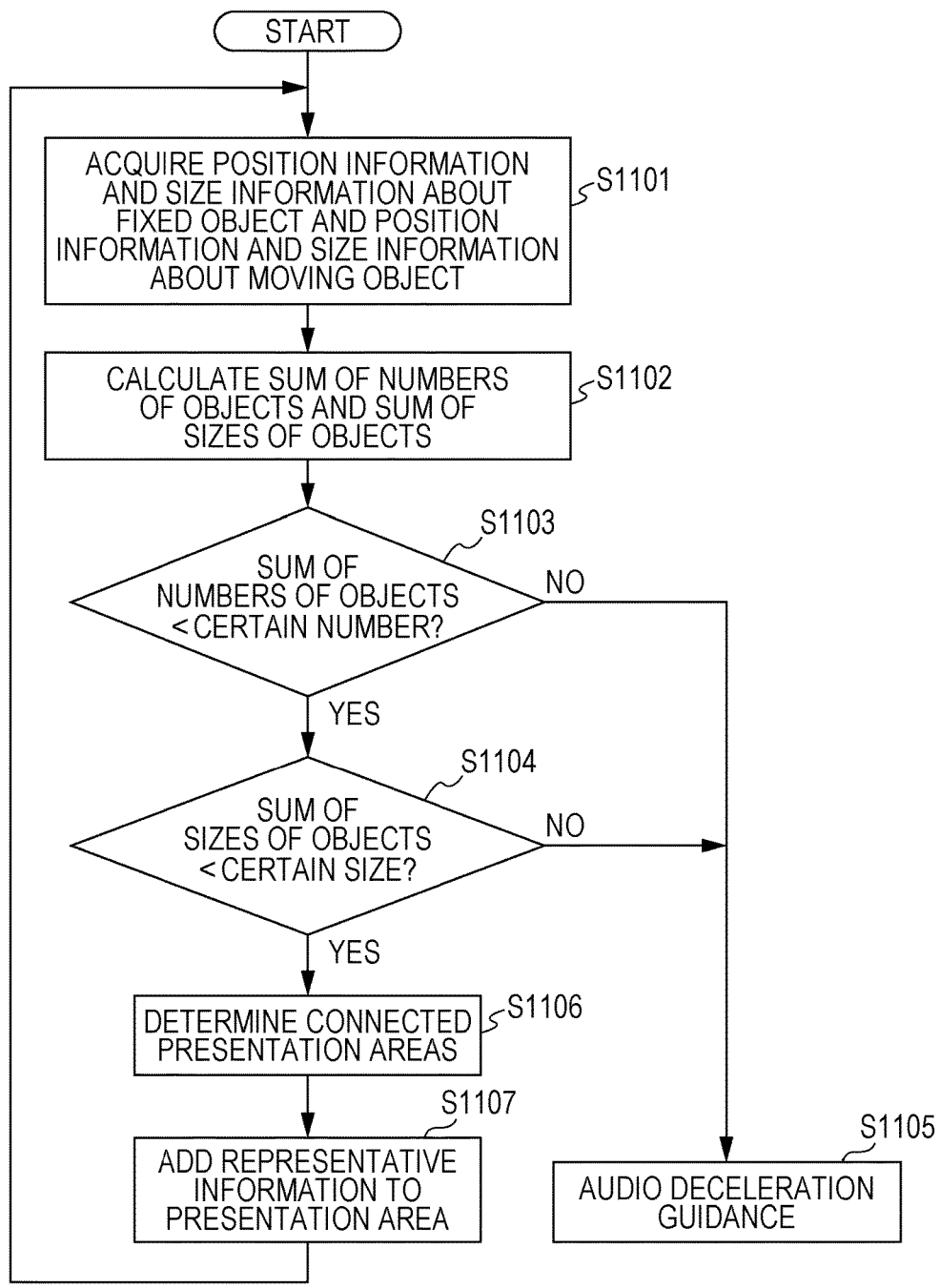

DISPLAY CONTROL APPARATUS, METHOD, RECORDING MEDIUM, AND VEHICLE

BACKGROUND

1. Technical Field

The present disclosure relates to a technology to control display of information for alerting the driver of a vehicle.

2. Description of the Related Art

Advanced Driver Assistance Systems (ADAS) for alerting the drivers of vehicles are currently in widespread use. Applications for the ADAS include Lane Departure Warning (LDW), Forward Collision Warning (FCW), and Pedestrian Collision Warning (PCW). In the ADAS, traveling environment including white lines, preceding vehicles and vehicles approaching from the behind, pedestrians on the traveling directions, and so on are detected with sensors, such as on-vehicle cameras or on-board radars, to display information based on the results of the detection. The information is displayed on, for example, meter displays, head-up displays (HUDs), head-mounted displays or helmet-mounted displays (HMDs), or Smart Glasses.

As is known as a phenomenon "inattentional blindness" in general, it is difficult for the drivers to recognize objects other than the objects to which the drivers give attention if the objects simultaneously exist. Therefore, the ADAS in which information about the objects, such as vehicles on the front side and/or pedestrians, detected with the sensors is overlapped and displayed on the foreground of the drivers has been developed. With the ADAS, it is possible to present the information about the objects which the drivers do not aggressively search for or which the drivers do not pay attention to the drivers, thus realizing effective driver assistance.

Information presentation apparatuses in related art, for example, generate two-dimensional feature maps to generate saliency maps indicating the focuses of attention from the two-dimensional feature maps. The two-dimensional feature maps result from mapping of simple visual features in an initial phase of visual information processing of human beings on the same spatial coordinate system as that of camera images on the basis of features, such as areas or centroids, of objects in the camera images. The focuses of attention are areas to which the drivers of vehicles are easy to pay attention and, for example, are areas where images of the preceding vehicles appear. If the objects which the drivers do not pay attention appear, the information presentation apparatuses in the related art re-create the saliency maps to move the focuses of attention to the areas where the objects appear. The information presentation apparatuses in the related art present the information to the drivers on the basis of the focuses of attention that are moved (for example, refer to Japanese Unexamined Patent Application Publication No. 2011-8772).

However, the technology in Japanese Unexamined Patent Application Publication No. 2011-8772 has a problem in that the movement of the focuses of attention triggers sight line shifts of the drivers to increase the burdens on the drivers. The technology in Japanese Unexamined Patent Application Publication No. 2011-8772 also has a problem in that the movement of the focuses of attention imposes a further burden on the drivers because the drivers pay attention to the focuses of attention that are moved to cause oversight.

SUMMARY

Thus, a non-limiting exemplary embodiment of the present disclosure provides a method for display control capable of causing a driver to recognize multiple objects to which attention should be paid without requiring the sight line shift of the driver.

According to an embodiment of the present disclosure, a method for a video system including a recognition unit that recognizes a moving body existing in a foreground of a user and a display source that displays a certain image generated on the basis of a result of the recognition by the recognition unit on a display medium includes determining whether two or more moving bodies exist in the foreground of the user on the basis of an input data from the recognition unit; and controlling the display source, if it is determined that two or more moving bodies exist, so as to generate the certain image representing a virtual line directed to each of the two or more moving bodies from a certain position or a certain axis and display the generated certain image on the display medium.

It should be noted that general or specific embodiments may be realized as a system, a method, an integrated circuit, a computer program, storage media, or any elective combination thereof.

According to the present disclosure, it is possible to cause a driver to recognize multiple objects to which attention should be paid without requiring the sight line shift of the driver.

BRIEF DESCRIPTION OF THE DRAWINGS

FIG. 3 illustrates an example of a foreground in information presentation in the information presentation apparatus according to the first embodiment of the present disclosure;

FIGS. 4A to 4D illustrate four examples of the information presentation in the information presentation apparatus according to the first embodiment of the present disclosure;

FIGS. 7A to 7D illustrate other four examples of the information presentation in the information presentation apparatus according to the first embodiment of the present disclosure;

FIGS. 8A to 8D illustrate other four examples of the information presentation in the information presentation apparatus according to the first embodiment of the present disclosure;

FIG. 10 illustrates an example of a foreground in the information presentation in the information presentation apparatus according to the second embodiment of the present disclosure;

FIG. 12 is a flowchart illustrating an exemplary operational process of an information presentation apparatus according to the third embodiment of the present disclosure;

FIG. 15 is a flowchart illustrating an exemplary operational process of an information presentation apparatus according to the fourth embodiment of the present disclosure;

DETAILED DESCRIPTION

Embodiments of the present disclosure will herein be described with reference to the attached drawings.

First Embodiment

A first embodiment of the present disclosure will now be described.

Figure 1:
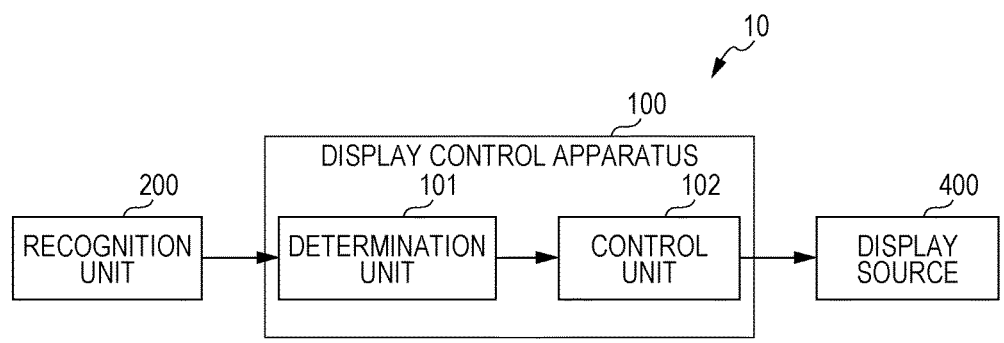
FIG. 1 is a block diagram illustrating an exemplary configuration of a projection apparatus according to first to fourth embodiments of the present disclosure.

FIG. 1 is a block diagram illustrating an exemplary configuration of a video system 10 according to the first embodiment. Referring to FIG. 1, the video system 10 includes a display control apparatus 100, a display source 400, and a recognition unit 200.

The recognition unit 200 acquires a foreground image representing the foreground of a user (hereinafter simply referred to as "foreground") to recognize a moving body included in the foreground image. Since the foreground image representing the foreground is acquired by a camera provided on the front side of a vehicle, the foreground of the user is the foreground in the direction in which the vehicle is traveling. Specifically, the recognition unit 200 acquires the foreground image that is captured by the camera (not illustrated) and that represents the foreground. When the user is the driver of the vehicle, the camera is mounted on the front side of the vehicle to capture an image of the foreground of the driver. When the user is a pedestrian, the camera is mounted in a wearable terminal to capture an image of the foreground of the pedestrian.

After acquiring the foreground image captured by the camera, the recognition unit 200 determines whether a predetermined object is included in the foreground image to recognize the moving body. The recognition unit 200 extracts features included in the image to perform object recognition on the basis of the extracted features. Since technologies concerning the object recognition are known, a detailed description of the technologies is omitted herein.

The display control apparatus 100 controls image data projected by the display source 400 on the basis of an input data from the recognition unit 200. Although the image data is described so as to be generated in the display source 400 in the following description, the image data may be generated by the display control apparatus 100 or another component that is not illustrated.

The display source 400 projects the image data onto a display (not illustrated). The display source 400 has a projector function and directly projects the image data onto the display (also referred to as a display medium). The display source 400 may use, for example, a display function on the display or an output function with a hologram, instead of the projector function. When the output function with the hologram is used, a method may be adopted in which part of parallel light beams led by internal total reflection of a light guide is emitted to cause a passenger to visually recognize a virtual image. The light guide performs the internal total reflection of the parallel light beams meeting an internal total reflection condition of the light guide to lead the light. Although the image data is not directly projected in the method using the light guide, unlike the projector, the term "projection" may be used for the description also in the method using the light guide, as in the projector method, for convenience.

When a light transmission display (an optical see-through display) or the like is used, the display source (hereinafter also referred to as a display unit) 400 displays the image data on the display. The image data may be described so as to be displayed on the display for simplification, also in a case in which a virtual-image projection display or the light transmission display is used.

For example, the HUD, the HMD, or the Smart Glasses are used as the display. The HUD may be, for example, a window shield of the vehicle or a glass plate or a plastic plate separately provided. The window shield may be a windshield or a glass of side window or a rear glass of the vehicle.

The display may be any of the virtual-image projection display, a retina projection display, the light transmission display (the optical see-through display), a video transmission display (a video see-through display), and a non-transmission display. An image to be displayed (a display image) may be the virtual image or a real image. Research and development of an on-vehicle HUD is advanced as the light transmission display (Hye Sun Park, Min Woo Park, Kwang Hee Won, Kyong-Ho Kim, and Soon Ki Jung, "In-Vehicle AR-HUD System to Provide Driving-Safety Information", ETRI Journal, Volume 35, Number 6, December 2013). For example, the light transmission display may be stuck on the internal surface of the window shield of the vehicle or may be incorporated into the window shield in a process to cast the window shield of the vehicle.

Although the display is described as a virtual-image projection HUD in the following description, the display is not limited to the virtual-image projection HUD and may be any of the various displays described above. When the light transmission display is used, instead of the HUD, the display image displayed on the display is recognized not as the virtual image but as the real image by the user.

The video system 10 may include the display described above.

The image data generated in the video system 10 includes display information to be presented to the user of the apparatus. The display information is displayed on the display as part of the image data. The display information that is displayed is visually recognized by the user as the virtual image. Since the principle that the display information projected onto the display is visually recognized by the user as the virtual image is well known, a description of the principle is omitted herein.

The display information may be projected onto the display so as to be overlapped on the foreground, instead of being projected onto the display as part of the image data. In this case, the display control apparatus 100 may control only the display information and the display source 400 may project only the display information onto the display. An example will be described below in which a virtual line, which is an example of the display information, is projected onto the display so as to be overlapped on the foreground.

Although an example will be described below in which the user is a passenger of the vehicle, particularly, the user is the driver of the vehicle, the user is not limited to a passenger of the vehicle or the driver of the vehicle. For example, when the HMD is adopted as the display, the user may be a passenger of the vehicle or a pedestrian. In other words, the video system 10 may an on-vehicle apparatus, may be an apparatus brought into the vehicle for usage, or may be an apparatus worn by the user during walking.

An exemplary configuration of the display control apparatus 100 of the first embodiment will now be described. Referring to FIG. 1, the display control apparatus 100 includes a determination unit 101 and a control unit 102. The determination unit 101 determines whether two or more moving bodies exist in the foreground on the basis of an input data from the recognition unit 200. If the determination unit 101 determines that two or more moving bodies exist, the control unit 102 controls the display source 400 so as to generate a certain image representing the virtual line directed to each of the two or more moving bodies from a certain position in the projection onto the display medium and project the generated certain image onto the display medium. This will be specifically described. The display control apparatus 100 may include a connecting unit with the recognition unit 200 and a connecting unit with the display source 400.

The determination unit 101 acquires information concerning each moving body from the recognition unit 200. The information concerning each moving body at least includes the presence of the moving body. The information concerning each moving body may include position information in the foreground. The determination unit 101 recognizes the number of moving bodies existing in the foreground on the basis of the information concerning each moving body. The determination unit 101 determines whether one moving body or two or more moving bodies exist in the foreground and outputs the result of the determination to the control unit 102.

If the determination unit 101 determines that two or more moving bodies exist in the foreground, the control unit 102 controls the display source 400 so as to generate the certain image and project the generated certain image onto the display. The certain image generated in the display source 400 is visually recognized by the user as the virtual image when the certain image is projected onto the display. The certain image is the virtual line directed to each of the two or more moving bodies from the certain position on the display. In other words, the virtual line is an image visually recognized so as to be directed to each of the two or more moving bodies from the certain position on the display when the user watches the foreground.

Figure 2:
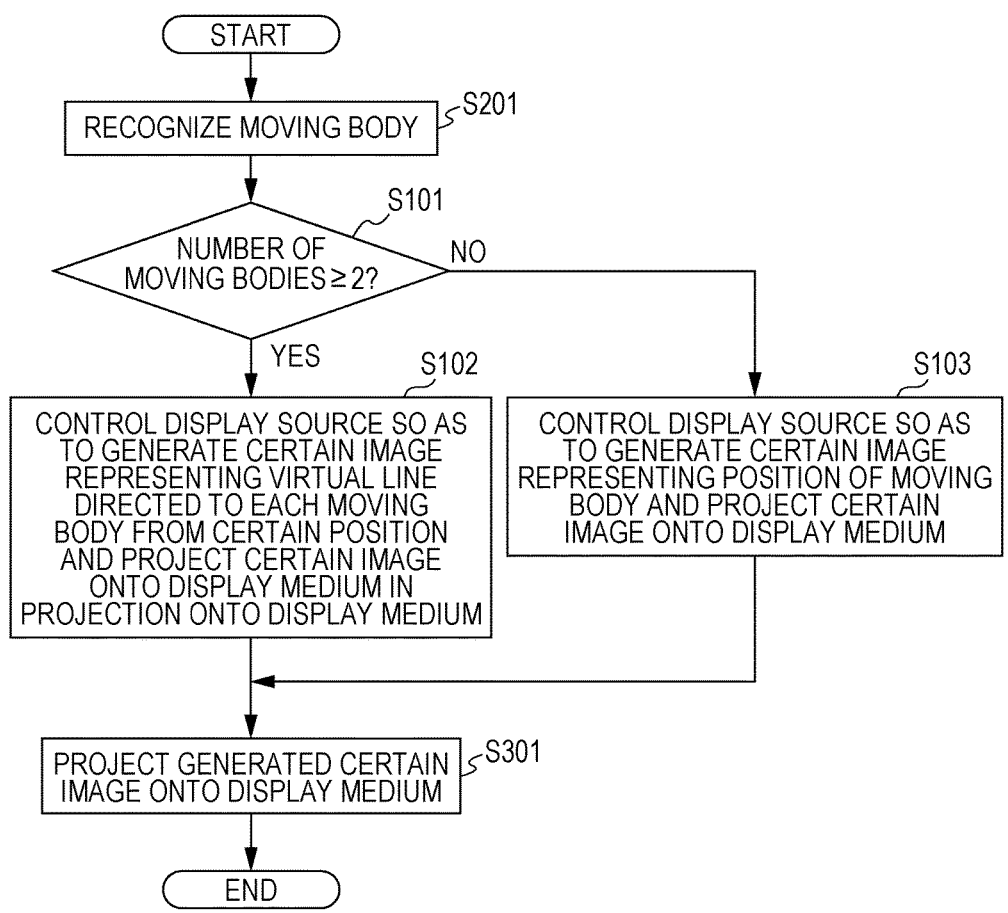
FIG. 2 is a flowchart illustrating an exemplary operational process of an information presentation apparatus according to the first embodiment of the present disclosure.
Figure 5B:
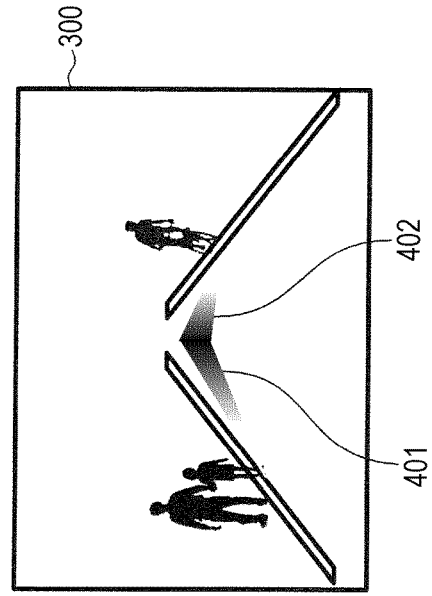
FIGS. 5A to 5D illustrate other four examples of the information presentation in the information presentation apparatus according to the first embodiment of the present disclosure.
Figure 5D:
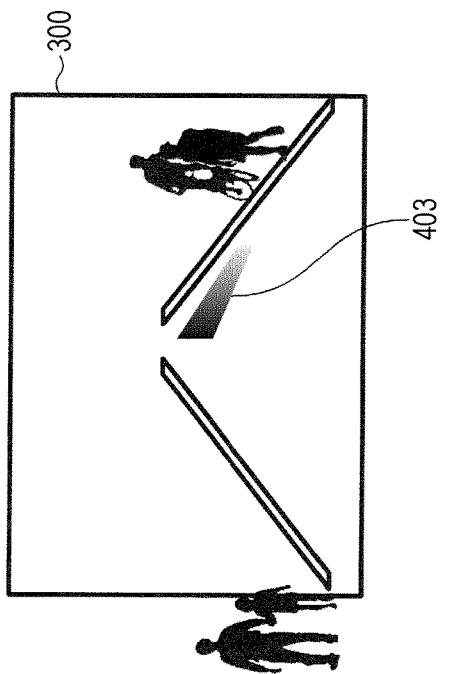
Figure 5A:
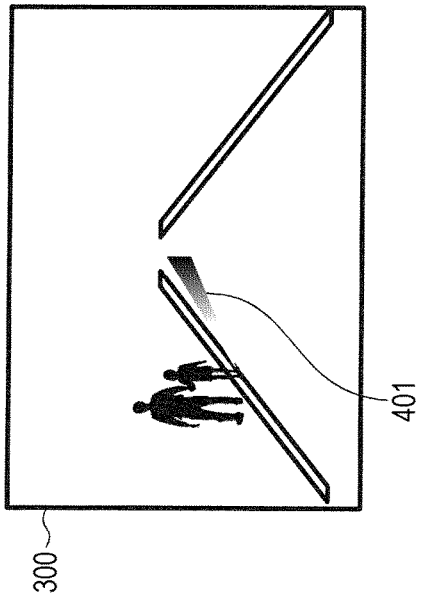
Figure 5C:
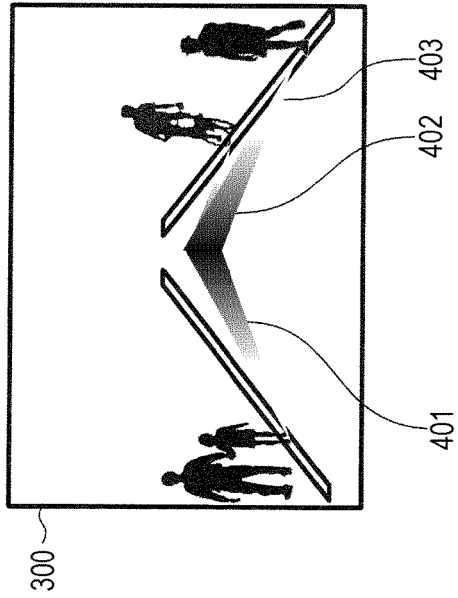
Figure 6B:
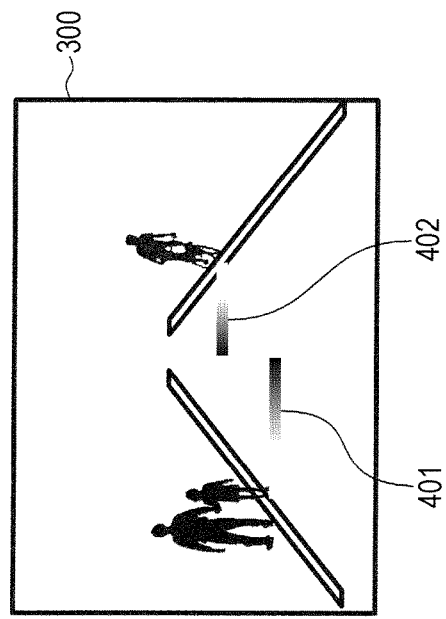
FIGS. 6A to 6D illustrate other four examples of the information presentation in the information presentation apparatus according to the first embodiment of the present disclosure.
Figure 6D:
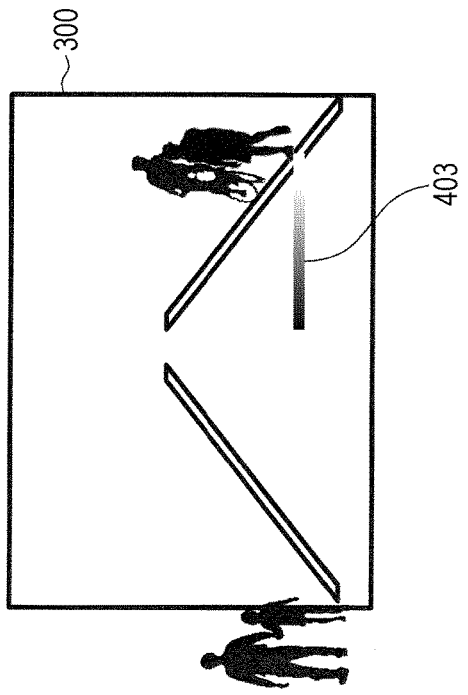
Figure 6A:
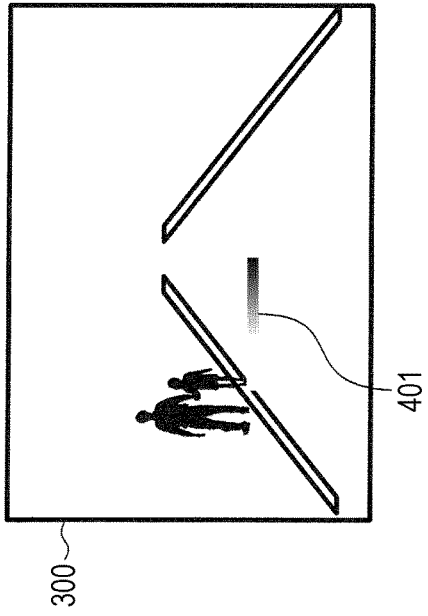
Figure 6C:
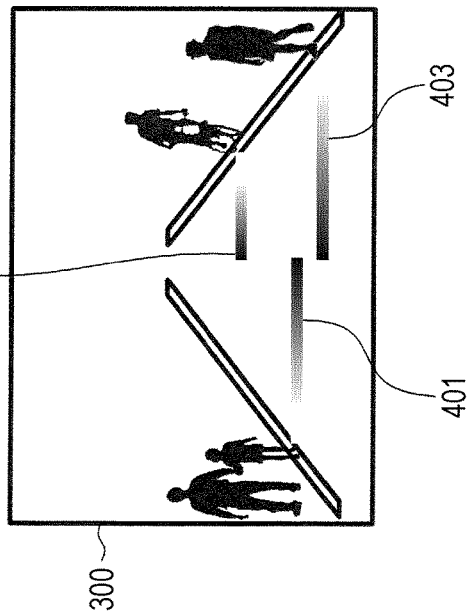

An exemplary operation of the display control apparatus 100 of the first embodiment will be described. FIG. 2 is a flowchart illustrating an exemplary operational process of the display control apparatus 100 of the first embodiment.

An example of the foreground illustrated in FIG. 3 is used in the description of the exemplary operation.

FIG. 3 illustrates an example of the foreground in a state in which the certain image representing the virtual line is not projected onto the display. For example, a road, buildings, and pedestrians on both sides of the road exist in a foreground 300 in FIG. 3 as a scene on the front side of the vehicle. A position 301 indicates the position of a pedestrian (an example of the moving body) who is walking or running on the left side in the traveling direction of the vehicle and a position 302 indicates the position of a pedestrian (an example of the moving body) who is walking or running on the right side in the traveling direction of the vehicle (refer to circles in FIG. 3). Reference numerals 311 to 313 in FIG. 3 will be described below.

Referring to FIG. 2, in Step S201, the recognition unit 200 acquires the foreground image representing the foreground to recognize any moving body included in the foreground. It is assumed here that one or more moving bodies exist in the foreground.

Steps S101 to S103 are performed by the display control apparatus 100. In Step S101, the determination unit 101 in the display control apparatus 100 determines whether two or more moving bodies exist in the foreground on the basis of the foreground image. If the determination unit 101 determines that two or more moving bodies exist in the foreground (YES in Step S101), the process goes to Step S102.

In Step S102, the control unit 102 in the display control apparatus 100 controls the display source 400 so as to generate the certain image, which is the virtual line directed to each of the multiple moving bodies from a certain position or a certain axis in the projection onto the display medium (the display), and project the generated certain image onto the display.

If the determination unit 101 determines that two or more moving bodies do not exist in the foreground, that is, the determination unit 101 determines that one moving body exists in the foreground (NO in Step S101), the process goes to Step S103.

In Step S103, the control unit 102 controls the display source 400 so as to generate the certain image, which is the virtual line directed to the moving body from a certain position or a certain axis in the projection onto the display, and project the generated certain image onto the display. The control unit 102 may control the display source 400 so as to generate the certain image representing the position of the moving body in the projection onto the display and project the generated certain image onto the display. The certain image representing the position of the moving body is displayed in, for example, a circular shape below the moving body. The shape of the certain image is not limited to the circle and the certain image is not limitedly displayed below the moving body.

In Step S301, the display source 400 generates the certain image on the basis of an instruction from the control unit 102. The display source 400 projects the generated certain image onto the display. The virtual image corresponding to the position of each moving body existing in the foreground is displayed in the above manner.

FIG. 4A to FIG. 4D illustrate examples of how the certain images generated in the display source 400 are projected onto the display. The certain images generated in the display source 400 will now be described with reference to FIG. 4A to FIG. 4D.

If the determination unit 101 determines that one moving body exists in the foreground, the projection of the certain image onto the display produces the foreground illustrated in FIG. 4A. In the example in FIG. 4A, an image 401 is a virtual line directed from a point 405 to the moving body.

The virtual line is overlapped on the foreground and is visually recognized by the user as the virtual image.

If the determination unit 101 determines that two moving bodies exist in the foreground, the projection of the certain images onto the display produces the foreground illustrated in FIG. 4B. In the example in FIG. 4B, each of the image 401 and an image 402 is a virtual line directed from the point 405 to each moving body. The virtual lines are overlapped on the foreground and are visually recognized by the user as the virtual images.

When the number of moving bodies is increased by one from the state illustrated in FIG. 4B, the determination unit 101 determines that three moving bodies exist and the foreground illustrated in FIG. 4C is produced. In the example in FIG. 4C, an image 403 is a virtual line directed from the point 405 to the moving body that is added. The virtual lines are overlapped on the foreground and are visually recognized by the user as the virtual images.

When the number of moving bodies is decreased by one from the state in FIG. 4C and the positions of the remaining moving bodies are overlapped with each other, the foreground illustrated in FIG. 4D is produced. In the example in FIG. 4D, the image 401 and the image 402 in FIG. 4C are not overlapped on the foreground and only the image 403 is overlapped on the foreground as the virtual line.

In the examples in FIG. 4A to FIG. 4D, the images 401 to 403 and the point 405 are the certain images generated in the display source 400, that is, the virtual lines. The user is capable of recognizing the number of branches of the virtual lines directed from the point 405 to the moving bodies and the directions of the virtual lines only by paying attention to the periphery of the point 405, which is the certain position, to intuitively understand the number and the positions of the moving bodies existing in the foreground. The point 405 may not be projected onto the display.

The virtual lines illustrated in FIG. 4A to FIG. 4D are only examples. The virtual lines may have wedge shapes, as illustrated in FIG. 5A to FIG. 5D, and may have thicknesses that are varied depending on the positions or the states of the moving bodies. In this case, it is possible for the user to intuitively understand the distance to each moving body and the risk of collision with the moving body by increasing the thickness of the virtual line at the certain position, for example, with the decreasing distance from the own vehicle to the moving body or with the increasing relative traveling speed of the moving body relative to the own vehicle. Since the thickness of the virtual line is decreased with the increasing distance from the certain position to the moving body, wasteful display is reduced for the user who pays attention to the periphery of the point 405. As a result, the user is not needed to pay attention to the virtual lines more than needs.

The starting point of the virtual line directed to each moving body may not be a certain position and may be a certain axis, as illustrated in FIG. 6A to FIG. 6D. In this case, for example, the user is capable of intuitively understanding the number and the positions of the moving bodies existing in the foreground by paying attention only to the periphery of the certain axis in the foreground. Alternatively, the certain axis may be projected onto the display as an image, as illustrated in FIG. 7A to FIG. 7D. In this case, it is possible for the user to define the range to which the user should pay attention. The user is capable of intuitively understanding the number and the positions of the moving bodies existing in the foreground by paying attention only to the periphery of the certain axis that is projected.

The certain position, which is the starting point of the virtual line directed to each moving body, may be a point of view of the user on the display medium, for example, which is calculated from the orientation and the line of sight of the user detected by an on-vehicle camera mounted in the vehicle. In this case, the user is capable of intuitively understanding the number and the positions of the moving bodies existing in the foreground regardless of where the point of view of the user exists.

The certain position, which is the starting point of the virtual line directed to each moving body, may be an end point of the preceding vehicle or a point on the contour of the preceding vehicle. For example, the left rear wheel of the preceding vehicle may be set as the certain position, which is the starting point of the virtual line directed to the moving body existing on the left side in the traveling direction of the own vehicle, and the right rear wheel of the preceding vehicle may be set as the certain position, which is the starting point of the virtual line directed to the moving body existing on the right side in the traveling direction of the own vehicle. In this case, the user is capable of intuitively understanding the number and the positions of the moving bodies existing on the left and right sides in the foreground while paying attention to the preceding vehicle.

The certain position, which is the starting point of the virtual lines, may be varied depending on the type or the state of each moving body. For example, the certain position, which is the starting point of the virtual lines, may be varied depending on whether the type of the object is a pedestrian or a bicycle. In this case, since the moving bodies are grouped as the pedestrians and the bicycles for display, the user is capable of understanding the number and the positions of the moving bodies of the type to which close attention should be paid by priority. Alternatively, for example, the certain position, which is the starting point of the virtual lines, may be varied depending on whether the moving body is approaching the own vehicle or is moving apart from the own vehicle. Alternatively, for example, the moving bodies may be grouped into multiple groups on the basis of the moving speeds and the certain position, which is the starting point of the virtual lines, may be varied for each group. In the above cases, the user is capable of understanding the number and the positions of the moving bodies that are approaching the own vehicle and that have higher risk of collision or the moving bodies having higher moving speeds by priority.

As illustrated in FIG. 5A to FIG. 5D, the color of the virtual lines may be lightened or the transparency of the virtual lines may be increased with the increasing distance from the point 405, which is the certain position, to each moving body. Alternatively, a combination of the above methods may be adopted. This reduces wasteful display for the user who pays attention to the periphery of the point 405. As a result, the user is not needed to pay attention to the virtual lines more than needs.

The virtual line may be a perpendicular extending from the position of each moving body to a vertical line close to the point of view of the user in the foreground, for example, the vertical line through the center of the foreground, as illustrated in FIG. 6A to FIG. 6D. If the user focuses on the foreground when the user simultaneously watches the foreground and the virtual lines, the virtual lines may be horizontally doubled. However, since the virtual lines extend horizontally, it is difficult for the user to recognize the virtual lines that are doubled. A vertical line connecting the perpendiculars extending to the vertical line through the center of the foreground may be visualized. The user is capable of intuitively understand the number and the positions of the moving bodies existing in the foreground by paying attention only to the vertical line connecting the perpendiculars extending to the vertical line through the center of the foreground.

As illustrated in FIG. 3, it is assumed that a basic sight line position (vanishing point) 311, a lower sight line position 312, and an upper sight line position 313 are defined in the front direction of the vehicle (refer to triangles in FIG. 3). The basic sight line position (vanishing point) 311 is a position to which the user normally pays attention in the foreground. The lower sight line position 312 is a position close to the vehicle on a line connecting the basic sight line position 311 to the vehicle. The upper sight line position 313 is a position far from the vehicle on the line connecting the basic sight line position 311 to the vehicle. The lower sight line position 312 and the upper sight line position 313 are not desirably overlapped with the preceding vehicle on the front side of the vehicle in the foreground and are desirably closer to the basic sight line position (vanishing point) 311 as much as possible. The basic sight line position 311, the lower sight line position 312, and the upper sight line position 313 are not projected onto the display.

FIG. 8A illustrates an example in which the moving bodies are directly connected to each other with the virtual line without using each position illustrated in FIG. 3. For example, directly connecting the two moving bodies closest to the own vehicle on the right side and the left side on the front side of the vehicle with the virtual lines allows the user to easily recognize the presence of the moving body to which the user should pay most attention. The virtual lines are reconnected each time the moving body closest to the own vehicle is switched.

FIG. 8B to FIG. 8D illustrate examples in which the moving bodies are connected to each other with the virtual lines by using the respective positions illustrated in FIG. 3. Specifically, FIG. 8B illustrates an example in which the position 301 of a first moving body is connected to the position 302 of a second moving body with the virtual lines via the basic sight line position 311. FIG. 8C illustrates an example in which the position 301 of the first moving body is connected to the position 302 of the second moving body with the virtual lines via the lower sight line position 312. FIG. 8D illustrates an example in which the position 301 of the first moving body is connected to the position 302 of the second moving body with the curved virtual lines via the upper sight line position 313. For example, if the preceding vehicle exists on the front side of the vehicle when the virtual lines are connected via the basic sight line position 311, as in FIG. 3B, the virtual lines may be overlapped and displayed on the preceding vehicle and the user may be difficult to visually recognize the preceding vehicle and the virtual lines. Connecting the moving bodies with the virtual lines via the lower sight line position 312 or the upper sight line position 313 avoids the difficulty in the visual recognition of the preceding vehicle and the virtual lines by the user.

The virtual lines illustrated in FIG. 8A to FIG. 8D are determined by the control unit 102, as in the virtual lines illustrated in FIG. 4A to FIG. 7D. Although the virtual lines have the linear shapes, the wedge shapes, or the curved shapes in the first embodiment, as illustrated in FIG. 4A to FIG. 8D, the shapes of the virtual lines are not limited to the above ones.

In the first embodiment, when it is not possible to present all the virtual lines under restrictions of, for example, the size of the display, part of the virtual lines may be presented in a range in which the virtual lines are capable of being presented.

Although the virtual lines are overlapped and displayed on the foreground in the first embodiment, the virtual lines are not limited to this. For example, the virtual lines may be overlapped and displayed on the image data of the foreground.

In the first embodiment, the virtual lines illustrated in FIG. 8A to FIG. 8D may be selectively used depending on the status of the front side of the vehicle. For example, the virtual line 401 illustrated in FIG. 8A may be displayed when no preceding vehicle exists, the virtual line 403 illustrated in FIG. 8C may be displayed when the vehicular gap between the own vehicle and the preceding vehicle is sufficiently kept, and a virtual line 404 illustrated in FIG. 8D may be displayed when the vehicular gap between the own vehicle and the preceding vehicle is not sufficiently kept.

As described above, the display control apparatus 100 of the first embodiment is characterized in that, when multiple moving bodies exist in the foreground, the virtual lines connecting the positions of the multiple moving bodies are overlapped on the foreground for the presentation to the user. Accordingly, the display control apparatus 100 is capable of causing the user to recognize the moving bodies, or the multiple objects to which attention should by paid, without requiring the sight line shift.

In the above embodiment, when it is determined that two or more moving bodies exist in the foreground, the certain image representing the virtual line directed to each of the two or more moving bodies from the certain position or the certain axis in the projection onto the display is generated and the certain image representing the virtual line is displayed on the display. Accordingly, it is possible for the user to pay attention to one point, the certain position or the certain axis, to recognize the respective directions in which the two or more moving bodies exist from the one point, for example, compared with a case in which images in which the two or more moving bodies are surrounded by rectangular lines are displayed. In other words, when the images in which the two or more moving bodies are surrounded by the rectangular lines are displayed, it is necessary for the user to recognize each of the two or more moving bodies while directing the line of sight to each of the images in which the two or more moving bodies are surrounded by the rectangular lines. For example, when pedestrians exist on the left-side sidewalk and the right-side sidewalk while the user is driving the vehicle, each of the images in which the pedestrians on the left-side sidewalk and the right-side sidewalk are surrounded by the rectangular lines draws attention of the user because the images in which the two or more moving bodies are surrounded by the rectangular lines are enhanced. Accordingly, the time during which the line of sight of the user stops is increased at each of the images in which the pedestrians on the left-side sidewalk and the right-side sidewalk are surrounded by the rectangular lines and the attention to the front side is reduced to possibly increase the risk.

In contrast, in the first embodiment, since the user is capable of paying attention to one point, the certain position or the certain axis, to recognize the respective directions in which the two or more moving bodies exist from the one point, it is possible for the user to acquire the information about the respective directions in which the two or more moving bodies exist at once by paying attention to the one point, the certain position or the certain axis. Accordingly, since the user is capable of acquiring the information about the respective directions in which the two or more moving bodies exist at once in the first embodiment, it is possible to instantaneously acquire the accurate information regardless of the number of the moving bodies. Consequently, it is possible for the user to acquire the information concerning the surrounding moving bodies while paying sufficient attention to the front side, for example, during the driving to safely drive the vehicle.

Although the position information about the moving bodies acquired by the determination unit 101 is recognized on the basis of the foreground image acquired by the recognition unit 200 in the above description, the position information about the moving bodies is not limitedly recognized in the above manner. For example, the position information about the moving bodies may be output from a position information generating apparatus (not illustrated) that generates the position information. The position information may be, for example, the position information indicated by the saliency map extracted from an output signal from a visual sensor, the position information indicating the positions of the bicycle, the pedestrian, and so on subjected to the image recognition, the position information indicating the relative position calculated from the positions of other surrounding moving bodies and the position of the own vehicle received through inter-vehicle communication, or the position information indicating the relative position calculated from the positions of other surrounding moving bodies and the position of the own vehicle received through road-to-vehicle communication from a road-side sensor.

Second Embodiment

A second embodiment of the present disclosure will now be described.

The block diagram illustrating an exemplary configuration of a video system according to the second embodiment is the same as that of the first embodiment illustrated in FIG. 1. Referring to FIG. 1, the video system 10 includes the display control apparatus 100, the display source 400, and the recognition unit 200. The display control apparatus 100 includes the determination unit 101 and the control unit 102. The operations of the recognition unit 200 and the display source 400 are same as those in the first embodiment.

Figure 9:
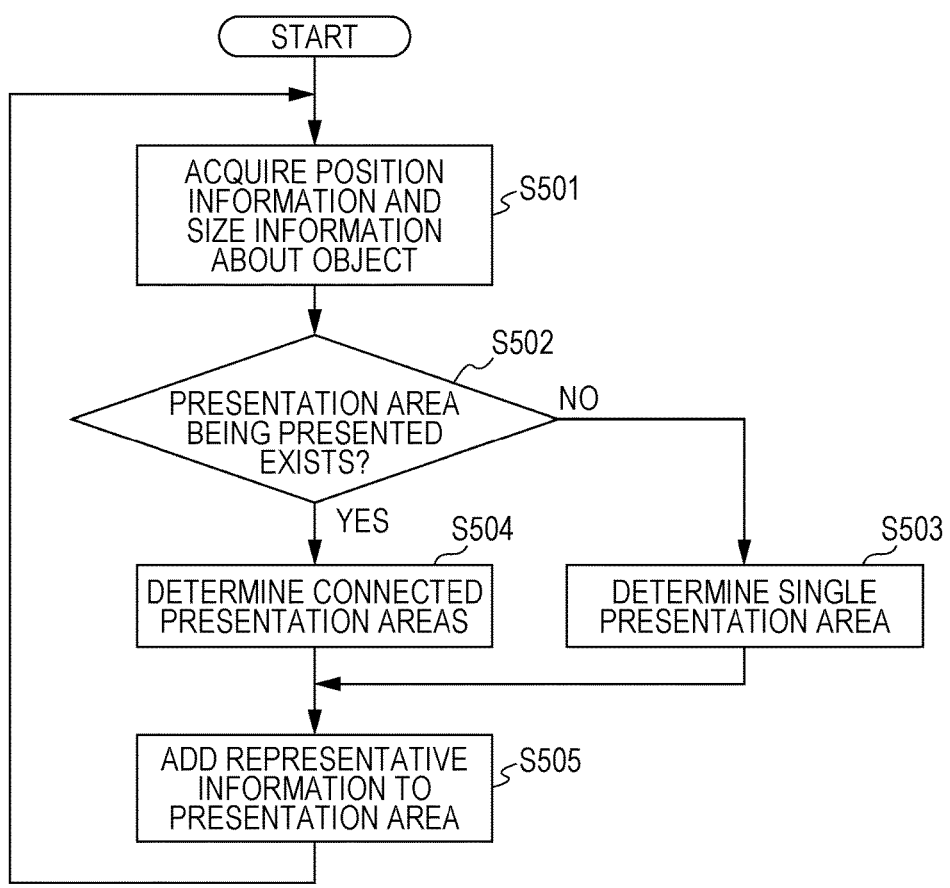
FIG. 9 is a flowchart illustrating an exemplary operational process of an information presentation apparatus according to the second embodiment of the present disclosure.

An exemplary operation of the display control apparatus 100 of the second embodiment will now be described. FIG. 9 is a flowchart illustrating an exemplary operational process of the display control apparatus 100 of the second embodiment.

An example of the foreground illustrated in FIG. 10 is used in the description of the exemplary operation. The "object" in the second embodiment has the same meaning as that of the "moving body" in the first embodiment. The user of the display control apparatus 100 is the driver of a vehicle in the second embodiment.

FIG. 10 illustrates an example of the foreground of the driver before a presentation area is presented. The same reference numerals are used in FIG. 10 to identify the same components in FIG. 3. A description of such components is omitted herein. Referring to FIG. 10, a frame 601 indicates the position and the size of a bicycle (an example of a first object) that is traveling on the left side in the traveling direction of the vehicle and a frame 602 indicates the position and the size of a bicycle (an example of a second object) that is traveling on the right side in the traveling direction of the vehicle (refer to rectangles in FIG. 10).

Referring to FIG. 9, in Step S501, the determination unit 101 acquires the position information and size information about the object from the recognition unit 200 as the information concerning the object. The size information indicates the apparent size of the object in the foreground. The frame 601 is acquired as the position information and the size information about the first object in the foreground 300 as an example here.

In Step S502, the determination unit 101 determines whether the presentation area that is being presented exists. The presentation area is a collective term of a single presentation area and connected presentation areas described below. If the determination unit 101 determines that no presentation area that is being presented exists (NO in Step S502), the process goes to Step S503.

In Step S503, the determination unit 101 determines the single presentation area on the basis of the position information and the size information that are acquired. The single presentation area is an area for presentation to indicate the position of one object. In other words, the single presentation area is a virtual graphic of a certain shape, which is visually recognized as the virtual image by the user so that the certain image exists at the position corresponding to the moving body when the certain image is projected on the display medium. The single presentation area corresponding to the position and the size of the first object is determined as an example here. The position where the single presentation area is displayed is determined, for example, to be below the first object, which corresponds to the position of the first object, and the single presentation area is determined to have an ellipse (refer to a presentation area 701a in FIG. 11A). The size of the single presentation area may be determined so as to reflect the size of the first object and the single presentation area may have a shape other than the ellipse. The single presentation area is not limitedly displayed below the object.

In Step S505, the control unit 102 adds representative information to the presentation area determined by the determination unit 101. The representative information indicates the type of the object and the state of the object. The control unit 102 supplies the presentation area to the display source 400. Then, the display source 400 projects the presentation area onto a certain display. This causes the presentation area, which is the virtual image and which corresponds to the object existing in the foreground of the driver, to be displayed. A predetermined color, blue, is added to the single presentation area corresponding to the first object as the representative information about the bicycle as an example here. As a result, the single presentation area corresponding to the first object (for example, the presentation area 701a in FIG. 11A) is displayed in blue in the foreground 300.

Then, the process goes back to Step S501. The description of the specific example will be continued.

In Step S501, the determination unit 101 acquires the position information and the size information about the object. The frame 602 is acquired as the position information and the size information about the second object in the foreground 300 as an example here.

In Step S502, the determination unit 101 determines whether the presentation area that is being presented exists. Since the single presentation area corresponding to the first object exists as the presentation area that is being presented in the foreground 300 as an example here (YES in Step S502), the process goes to Step S504.

In Step S504, the determination unit 101 determines the connected presentation areas on the basis of the position information and the size information that are acquired. The connected presentation areas are the presentation areas to connect the positions of multiple objects. When the presentation area has already been presented, the connected presentation areas correspond to the single presentation area of an object the position information and the size information about which are newly acquired and the virtual lines connecting the positions of the multiple objects. Here, the single presentation area of the second object (for example, a presentation area 702a in FIG. 11A) is determined and virtual lines (for example, presentation areas 703a and 704a in FIG. 11A) connecting the position of the first object to the position of the second object are determined.

In Step S505, the control unit 102 adds the representative information to the presentation areas determined by the determination unit 101. Then, the presentation areas are supplied to the display source 400 where the presentation areas are projected on the certain display as the virtual images.

Figure 11A:
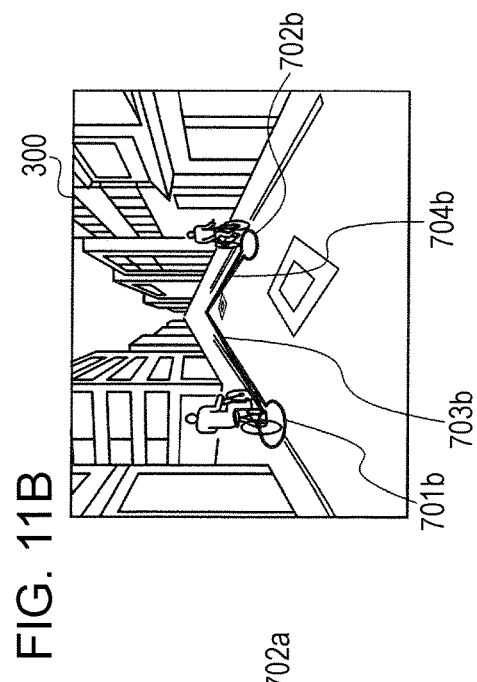
FIGS. 11A to 11D illustrate four examples of the information presentation in the information presentation apparatus according to the second embodiment of the present disclosure.

An example of how the single presentation areas and the virtual lines are displayed is illustrated in FIG. 11A. As illustrated in FIG. 11A, the ellipsoidal presentation area 701a is displayed below the first object and the ellipsoidal presentation area 702a is displayed below the second object. The virtual line 703a is displayed so as to project from part of the periphery of the presentation area 701a, and the presentation area 704a is displayed so as to project from part of the periphery of the presentation area 702a. The virtual line 703a and the virtual line 704a connect the position of the first object to the position of the second object. The predetermined color, blue, is added to the single presentation areas and the virtual lines as the representative information about the bicycles as an example here. For example, in the example in FIG. 11A, the presentation areas 701a and 702a and the virtual lines 703a and 704a are displayed in blue.

The presentation of the virtual lines is not limited to the manner illustrated in the example in FIG. 11A. Other examples of how the virtual lines are presented will now be described with reference to FIG. 10 and FIG. 11B to FIG. 11D. Since the basic sight line position (vanishing point) 311, the lower sight line position 312, and the upper sight line position 313 illustrated in FIG. 10 are described above in the first embodiment, a description of them is omitted herein.

Figure 11B:
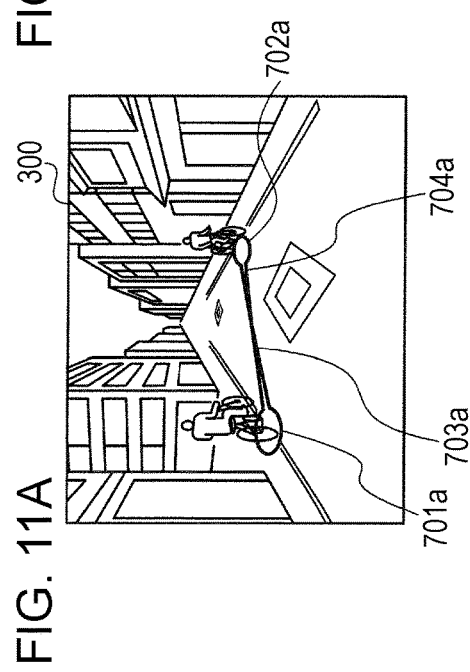

FIG. 11B illustrates another example 1 in the second embodiment. In the example in FIG. 11B, a virtual line 703b projecting from a single presentation area 701b corresponding to the first object is connected to a virtual line 704b projecting from a single presentation area 702b corresponding to the second object via the basic sight line position 311 illustrated in FIG. 10.

Figure 11C:
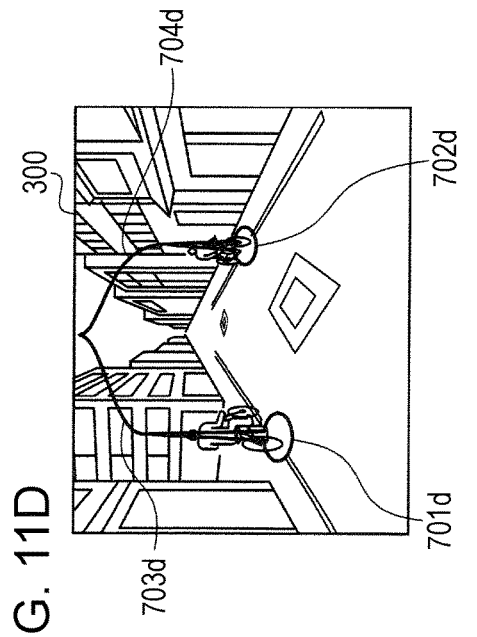

FIG. 11C illustrates another example 2 in the second embodiment. In the example in FIG. 11C, a virtual line 703c projecting from a single presentation area 701c corresponding to the first object is connected to a virtual line 704c projecting from a single presentation area 702c corresponding to the second object via the lower sight line position 312 illustrated in FIG. 10.

Figure 11D:
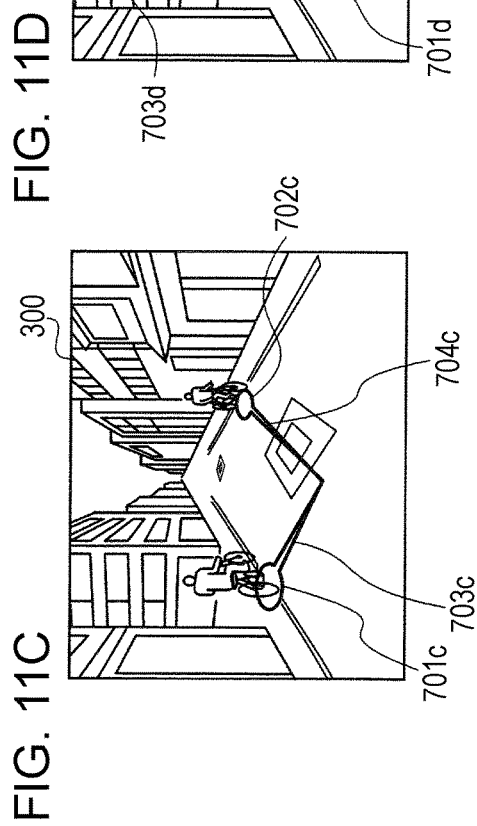

FIG. 11D illustrates another example 3 in the second embodiment. In the example in FIG. 11B, a virtual line 703d projecting from a single presentation area 701d corresponding to the first object is connected to a virtual line 704d projecting from a single presentation area 702d corresponding to the second object via the upper sight line position 313 illustrated in FIG. 10. Since the upper sight line position 313 is positioned so as not to be overlapped with the preceding vehicle in FIG. 11D, the virtual lines 703d and 704d are not overlapped and displayed on the preceding vehicle.

The single presentation areas and the virtual lines illustrated in FIG. 11B to FIG. 11D are determined by the determination unit 101 in Steps S503 and S504 in FIG. 9, as in the single presentation areas and the virtual lines illustrated in FIG. 11A. Specifically, the determination unit 101 determines the single presentation areas described above on the basis of the position information about the first object, the position information about the second object, which are acquired, the basic sight line position 311, the lower sight line position 312, and the upper sight line position 313 and determines the virtual lines described in any of the examples.

The shapes of the virtual lines are not limited to the ones illustrated in FIG. 11A to FIG. 11D in the second embodiment. For example, when the preceding vehicle exists on the front side of the view of the driver, the virtual lines may have a shape allowing the positions of the objects to be connected so as not to be overlapped with the preceding vehicle or only part of the virtual lines which is overlapped with the preceding vehicle may not be displayed. This avoids the difficulty in the visual recognition of the preceding vehicle by the user because of the virtual lines that are overlapped and displayed on the preceding vehicle.

In the second embodiment, the virtual lines illustrated in FIG. 11A to FIG. 11D may be selectively used depending on the status of the front side of the vehicle. For example, the virtual lines 703a and 704a illustrated in FIG. 11A may be displayed when no preceding vehicle exists, the virtual lines 703c and 704c illustrated in FIG. 11C may be displayed when the vehicular gap between the own vehicle and the preceding vehicle is sufficiently kept, and the virtual lines 703d and 704d illustrated in FIG. 11D may be displayed when the vehicular gap between the own vehicle and the preceding vehicle is not sufficiently kept.

In the second embodiment, the virtual lines illustrated in FIG. 11A to FIG. 11D, that is, the presentation area corresponding to the first object and the presentation area corresponding to the second object (for example, the presentation areas 703a and 704a, the presentation areas 703b and 704b, the presentation areas 703c and 704c, and the presentation areas 703d and 704d) are not necessarily connected to each other. For example, a tip of the presentation area corresponding to the first object toward the certain position may be close to a tip of the presentation area corresponding to the second object toward the certain position at the certain position in the foreground 300. The distance between the tips is determined in advance. The certain position is not limited to the basic sight line position 311, the lower sight line position 312, and the upper sight line position 313. However, the certain position is desirably close to the normal sight line position (for example, the basic sight line position 311) during the driving from safety aspect.

Although the size of the single presentation area is determined on the basis of the size of the object (the size information about the object) in the second embodiment, the size of the single presentation area may be determined on the basis of the distance between the object and the own vehicle (distance information) or at least one of the speed of the object, the speed of the own vehicle, and the relative speed (speed information) between the object and the own vehicle.

In the second embodiment, when it is not possible to present all the virtual lines under restrictions of, for example, the size of the display, part of the virtual lines may be presented in a range in which the virtual lines are capable of being presented.

Although the single presentation areas and the virtual lines are overlapped and displayed on the foreground which the driver is capable of visually recognizing in the second embodiment, the single presentation areas and the virtual lines are not limited to this. For example, the single presentation areas and the virtual lines may be overlapped and displayed on the image data of the foreground which the driver is capable of visually recognizing.

Although the representative information added to the single presentation areas and the virtual lines is a color in the second embodiment, the presentation areas may be translucent so that the driver is capable of visually recognizing the background of the presentation areas in this case. The representative information may be a shape. The shape of the single presentation area is set to, for example, a rectangle or a star shape depending on the type of the object.

As described above, the display control apparatus 100 of the second embodiment has the characteristics of the first embodiment and is characterized in that the size of the single presentation area is determined on the basis of the size of the object. Accordingly, the display control apparatus 100 achieves the advantages of the first embodiment and is capable of causing the driver to feel the sense of distance between the object and the own vehicle, specifically, to determine whether the object is approaching the own vehicle or is moving apart from the own vehicle.

Third Embodiment

A third embodiment of the present disclosure will now be described.

A phenomenon called attentional blink is known as a visual feature of human beings. The attentional blink is a phenomenon in which attention is made temporarily unavailable, like a case in which human beings are temporarily blinded to the external world when they blink. The driver is not capable of paying attention to the second object during an attentional dwell time after the driver pays attention to the first object in the foreground. Although the attentional dwell time is, for example, 0.6 seconds to 0.7 seconds, the attentional dwell time may have another value due to individual differences. If the information corresponding to the second object is presented, for example, within 0.6 seconds after the information corresponding to the first object is presented when the attentional dwell time is 0.6 seconds, the driver may possibly overlook either of the objects. In the ADAS, when the information about an object to which attention should be paid (for example, the position information and the size information) is acquired, it is necessary to present the information (for example, the presentation area) corresponding to the object as soon as possible. Accordingly, it may be considered that the presentation areas for multiple objects are presented substantially simultaneously with the acquisition of the position information and the size information about the respective objects (the timing when the position information and the size information about the respective objects are acquired is hereinafter referred to as information acquisition timing). In the second embodiment, the determination of the virtual lines when the position information and the size information about multiple objects are acquired in a time within the attentional dwell time allows the driver to recognize the multiple objects without causing the overlook during the attentional blink.

The block diagram illustrating an exemplary configuration of a video system according to the third embodiment is the same as that of the first embodiment illustrated in FIG. 1. Referring to FIG. 1, the video system 10 includes the display control apparatus 100, the display source 400, and the recognition unit 200. The display control apparatus 100 includes the determination unit 101 and the control unit 102. The operations of the recognition unit 200 and the display source 400 are same as those in the first embodiment.

An exemplary operation of the display control apparatus 100 of the third embodiment will now be described. FIG. 12 is a flowchart illustrating an exemplary operational process of the display control apparatus 100 of the third embodiment. The "object" in the third embodiment has the same meaning as that of the "moving body" in the first embodiment. The user of the display control apparatus 100 is the driver of a vehicle in the third embodiment.

Figure 13:
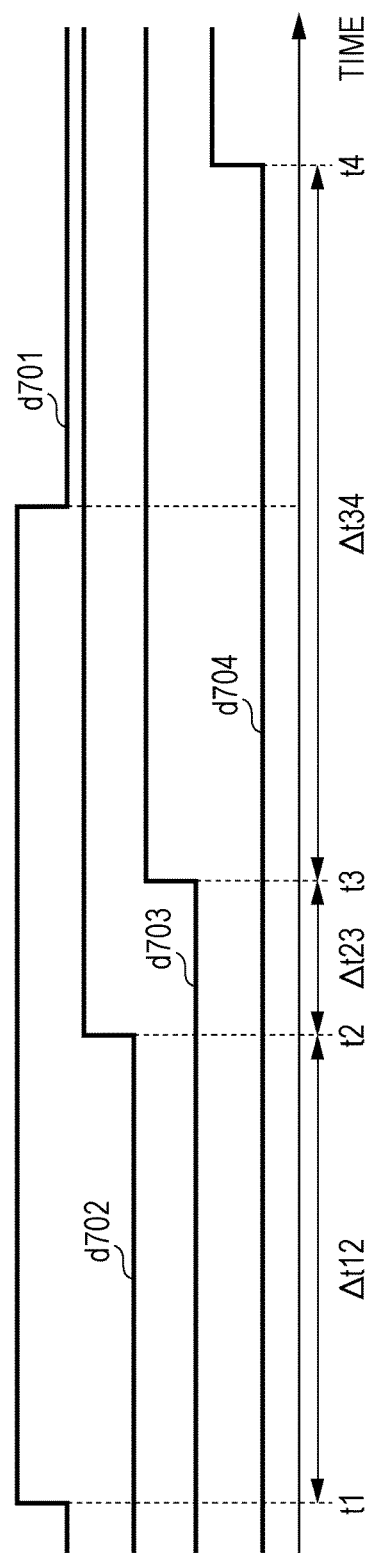
FIG. 13 is a timing chart indicating an example of information acquisition timing in the information presentation apparatus according to the third embodiment of the present disclosure.

A timing chart illustrated in FIG. 13 and an example of the foreground illustrated in FIG. 10 are used in the description of the exemplary operation.

FIG. 13 is the timing chart indicating an example of the information acquisition timing of an object by the determination unit 101 during a time period from a time t1 to a time t4. The horizontal axis represents time and the vertical axis indicates whether the information is acquired in FIG. 13. When a rectangular wave has a high value on the vertical axis, the position information and the size information are acquired and the object corresponding to the position information and the size information exists in the foreground. In contrast, when the rectangular wave has a low value on the vertical axis, the position information and the size information are not acquired and the object corresponding to the position information and the size information does not exist in the foreground. Referring to FIG. 13, reference numeral d701 denotes the information acquisition timing of the position information and the size information about the first object and reference numeral d702 denotes the information acquisition timing of the position information and the size information about the second object. Similarly, reference numeral d703 denotes the information acquisition timing of the position information and the size information about a third object and reference numeral d704 denotes the information acquisition timing of the position information and the size information about a fourth object.

Figure 14A:
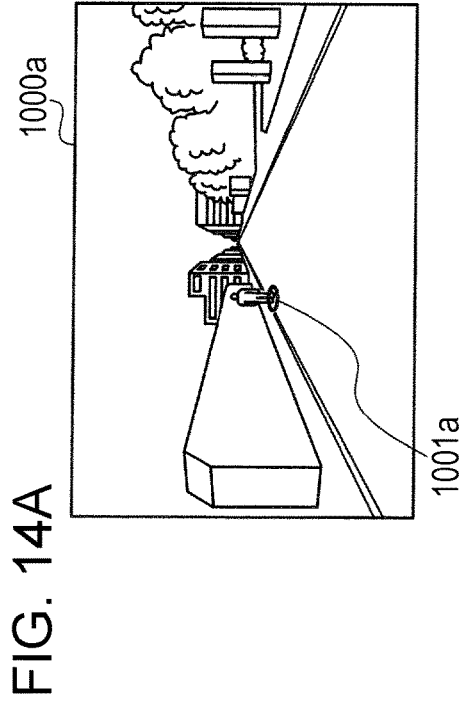
FIGS. 14A to 14C illustrate three examples of the information presentation in the information presentation apparatus according to the third embodiment of the present disclosure.
Figure 14B:
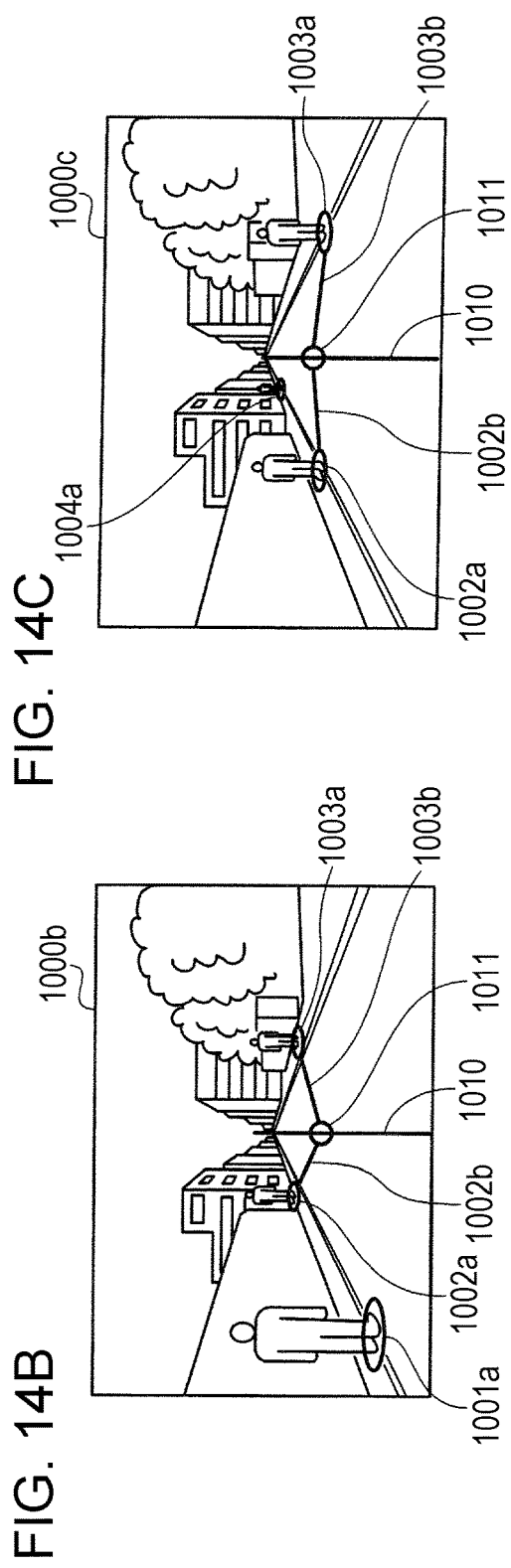
Figure 14C:
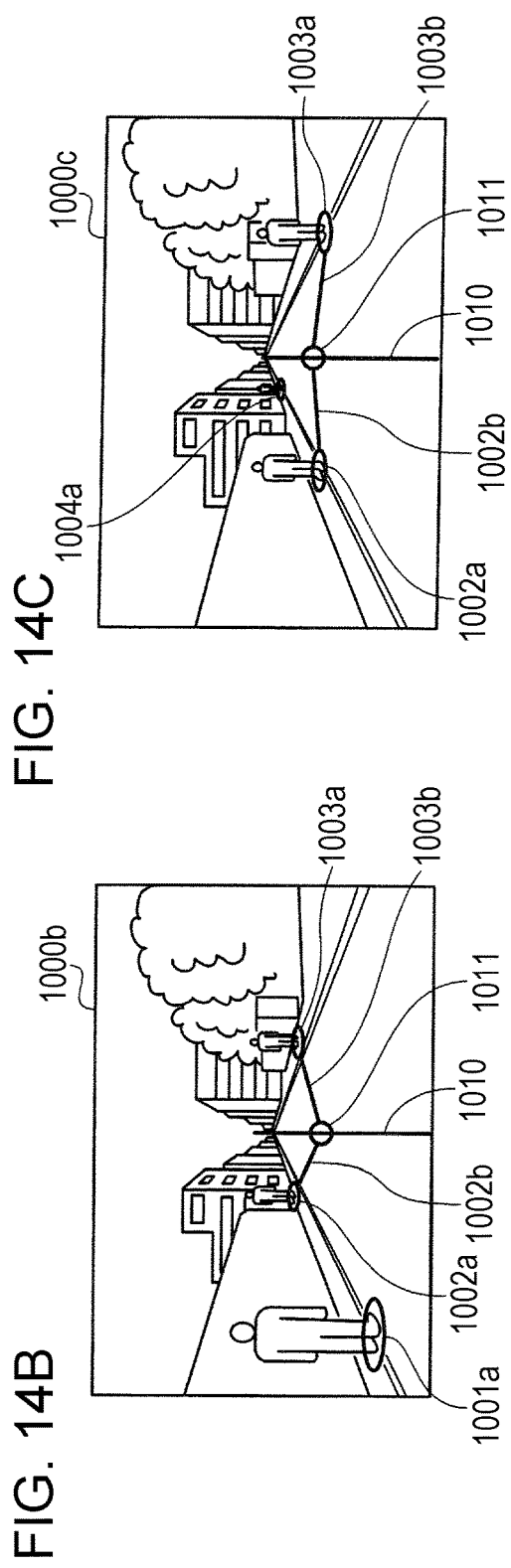

FIG. 14A, FIG. 14B, and FIG. 14C illustrate examples of the foreground that is varied with the progress of the vehicle in time series. FIG. 14A illustrates an example of how the presentation area is presented in a foreground 1000a at the time t1. A presentation area 1001a is the single presentation area corresponding to the first object. The first object is, for example, a pedestrian who is walking on the left side in the traveling direction of the vehicle.

FIG. 14B illustrates an example of how the presentation areas are presented in a foreground 1000b at the time t3. In this example, the following presentation areas are presented, in addition to the presentation area 1001a described above. A presentation area 1002a is the single presentation area corresponding to the second object and a presentation area 1002b is the virtual line projecting from the presentation area 1002a. The second object is, for example, a pedestrian who is walking on the left side in the traveling direction of the vehicle. A presentation area 1003a is the single presentation area corresponding to the third object and a presentation area 1003b is the virtual line projecting from the presentation area 1003a. The third object is, for example, a pedestrian who is walking on the right side in the traveling direction of the vehicle. A line segment 1010 is a straight line connecting the basic sight line position (refer to reference numeral 311 in FIG. 3 and FIG. 10) to the own vehicle. A point 1011 is on the line segment 1010 and is at a position where the sum of the distance from the position of the first object, the distance from the position of the second object, and the distance from the position of the third object is minimized. The line segment 1010 and the point 1011 are virtual objects on which the display of the virtual lines is based and are not displayed on the display.

FIG. 14C illustrates an example of how the presentation areas are presented in a foreground 1000c at the time t4. In this example, the presentation of the presentation area 1001a described above disappears and a presentation area 1004a is newly presented. In other words, this example indicates a case in which the first object disappears from the foreground and the fourth object newly appears in the foreground. The presentation area 1004a is the single presentation area corresponding to the fourth object. The fourth object is, for example, a pedestrian who is walking on the left side in the traveling direction of the vehicle. In the example in FIG. 14C, the point 1011 is on the line segment 1010 and is at a position where the sum of the distance from the position of the second object, the distance from the position of the third object, and the distance from the position of the fourth object is minimized.

The flowchart illustrating an exemplary operational process of the display control apparatus 100 of the second embodiment will now be described.

Referring to FIG. 12, in Step S801, the determination unit 101 acquires the position information and the size information about the object from the recognition unit 200. For example, at the time t1, the determination unit 101 acquires the position information and the size information about the first object. For example, at the time t2, the determination unit 101 acquires the position information and the size information about the second object. For example, at the time t3, the determination unit 101 acquires the position information and the size information about the third object. For example, at the time t4, the determination unit 101 acquires the position information and the size information about the fourth object. The position information and the size information are, for example, the frames surrounding the objects (for example, refer to the frames 601 and 602 in FIG. 10).

In Step S802, the determination unit 101 stores a time (an information acquisition time) when the position information and the size information about the object is acquired. For example, when the position information and the size information about the first object are acquired, the determination unit 101 stores the time t1 when the position information and the size information about the first object are acquired. For example, when the position information and the size information about the second object are acquired, the determination unit 101 stores the time t2 when the position information and the size information about the second object are acquired. For example, when the position information and the size information about the third object are acquired, the determination unit 101 stores the time t3 when the position information and the size information about the third object are acquired. For example, when the position information and the size information about the fourth object are acquired, the determination unit 101 stores the time t4 when the position information and the size information about the fourth object are acquired.

In Step S803, the determination unit 101 determines whether the presentation area that is being presented exists. If the determination unit 101 determines that no presentation area that is being presented exists (NO in Step S803), the process goes to Step S805. For example, when the position information and the size information about the first object are acquired, the process goes to Step S805 because no presentation area that is being presented exists. If the determination unit 101 determines that the presentation area that is being presented exists (YES in Step S803), the process goes to Step S804. For example, when the position information and the size information about each of the second object, the third object, and the fourth object are acquired, the process goes to Step S804 because the presentation area that is being presented exists.

In Step S804, the determination unit 101 determines whether the difference between the information acquisition times is shorter than a certain time. The certain time is the attentional dwell time described above and is, for example, 0.6 seconds. However, the certain time is not limited to this. For example, at the time t2, the determination unit 101 determines whether the difference between the time t2 and the time t1 ($\Delta$t12 in FIG. 13) is shorter than the certain time. For example, at the time t3, the determination unit 101 determines whether the difference between the time t3 and the time t2 ($\Delta$t23 in FIG. 13) is shorter than the certain time. For example, at the time t4, the determination unit 101 determines whether the difference between the time t4 and the time t3 ($\Delta$t34 in FIG. 13) is shorter than the certain time.

If the determination unit 101 determines that the difference between the information acquisition times is longer than or equal to the certain time (NO in Step S804), the process goes to Step S805. For example, at the time t2, the determination unit 101 determines that the difference between the time t2 and the time t1 is longer than or equal to the certain time. For example, at the time t4, the determination unit 101 determines that the difference between the time t4 and the time t3 is longer than or equal to the certain time.

If the determination unit 101 determines that the difference between the information acquisition times is shorter than the certain time (YES in Step S804), the process goes to Step S806. For example, at the time t3, the determination unit 101 determines that the difference between the time t3 and the time t2 is shorter than the certain time.

In Step S805, the determination unit 101 determines the single presentation area on the basis of the position information and the size information that are acquired. For example, if the determination unit 101 determines that no presentation area that is being presented exists (NO in Step S803), the determination unit 101 determines the single presentation area corresponding to the first object on the basis of the position information and the size information about the first object. This single presentation area is, for example, the presentation area 1001a in FIG. 14A. For example, if the determination unit 101 determines that the difference between the time t2 and the time t1 is longer than or equal to the certain time (NO in Step S804), the determination unit 101 determines the single presentation area corresponding to the second object on the basis of the position information and the size information about the second object. This single presentation area is, for example, the presentation area 1002a in FIG. 14B. For example, if the determination unit 101 determines that the difference between the time t4 and the time t3 is longer than or equal to the certain time (NO in Step S804), the determination unit 101 determines the single presentation area corresponding to the fourth object on the basis of the position information and the size information about the fourth object. This single presentation area is, for example, the presentation area 1004a in FIG. 14C.

In Step S806, the determination unit 101 determines the connected presentation areas for connecting the position of the third object to the position of the second object on the basis of the position information and the size information that are acquired. For example, if the determination unit 101 determines that the difference between the time t3 and the time t2 is shorter than the certain time (YES in Step S804), the determination unit 101 determines the single presentation area corresponding to the third object and also determines the virtual lines connecting the position of the third object to the position of the second object. A specific example of this operation will now be described.

First, the determination unit 101 determines the single presentation area corresponding to the third object on the basis of the position information and the size information about the third object. This single presentation area is, for example, the presentation area 1003a in FIG. 14B.

Then, the determination unit 101 identifies the point 1011 where the sum of the distances from the positions of all the objects existing in the foreground is minimized on the line segment 1010. For example, in the case of the foreground 1000b illustrated in FIG. 14B, the determination unit 101 identifies the point 1011 where the sum of the distances from the positions of the first object, the second object, and the third object is minimized on the line segment 1010. For example, in the case of the foreground 1000c illustrated in FIG. 14C, the determination unit 101 identifies the point 1011 where the sum of the distances from the positions of the second object, the third object, and the fourth object is minimized on the line segment 1010.

Then, the determination unit 101 determines the virtual line so as to project from the single presentation area corresponding to the second object to the point 1011. This virtual line is, for example, the presentation area 1002b illustrated in FIG. 14B and FIG. 14C.

Similarly, the determination unit 101 determines the virtual line so as to project from the single presentation area corresponding to the third object to the point 1011. This virtual line is, for example, the presentation area 1003b illustrated in FIG. 14B and FIG. 14C.

The presentation area 1002a is connected to the presentation area 1003a via the point 1011 in the above manner. In other words, the presentation area 1002a and the presentation area 1003a are determined to be the virtual lines connecting the position of the third object to the position of the second object.

In Step S807, the control unit 102 adds the representative information to the presentation area determined by the determination unit 101. Then, the representative information is supplied to the display source 400 where the representative information is projected on a certain display as the virtual image. A predetermined color, red, is added to the single presentation areas and the virtual lines as the representative information about the pedestrian as an example here. For example, in FIG. 14A to FIG. 14C, the presentation areas 1001a, 1002a, 1003a, and 1004a, and the virtual lines 1002b and 1003b are displayed in red.

The shapes of the virtual lines are not limited to the ones illustrated in FIG. 14A to FIG. 14C in the third embodiment. For example, when the preceding vehicle exists on the front side of the foreground, the virtual lines may have a shape allowing the positions of the objects to be connected to each other so as not to be overlapped with the preceding vehicle, only part of the virtual lines which is overlapped with the preceding vehicle may not be displayed, or a point on the line segment (for example, the point 1011) may be positioned so as not to be overlapped with the preceding vehicle and the virtual lines may have a shape allowing the position of the object to be connected to the point on the line segment. This avoids the difficulty in the visual recognition of the preceding vehicle by the user because of the virtual lines that are overlapped and displayed on the preceding vehicle.

Although the determination unit 101 determines whether the difference between the information acquisition times of the two objects is shorter than the certain time in the third embodiment, the time compared with the certain time is not limited to the difference between the information acquisition times of the two objects. For example, the time compared with the certain time may be the difference between the information acquisition time of the first object and the time when the own vehicle is estimated to come close to the second object within a certain distance from the traveling speed and the position when the second object is the object most closest to the own vehicle.

Although the determination unit 101 determines whether the difference between the information acquisition times of the two objects appearing in the foreground is shorter than the certain time in the third embodiment, the time compared with the certain time is not limited to the difference between the information acquisition times of the two objects appearing in the foreground. For example, the objects may be limited to the object the moving direction of which is varied, such as a pedestrian who is moving along the sidewalk and starts to cross the road, or the object the moving speed of which is varied, such as a bicycle that is moving slowly at a walking speed and starts to move at a higher speed. Priority may be given to these objects over other objects.

Although the size of the single presentation area is varied depending on the size of the object in the third embodiment, the size of the single presentation area may be varied depending on the distance between the object and the own vehicle or at least one of the speed of the object, the speed of the own vehicle, and the relative speed between the object and the own vehicle.

In the third embodiment, when it is not possible to present all the virtual lines under restrictions of, for example, the size of the display, part of the virtual lines may be presented in a range in which the virtual lines are capable of being presented.

Although the single presentation areas and the virtual lines are overlapped and displayed on the foreground which the driver is capable of visually recognizing in the third embodiment, the single presentation areas and the virtual lines are not limited to this. For example, the single presentation areas and the virtual lines may be overlapped and displayed on the image data of the foreground which the driver is capable of visually recognizing.

Although the representative information added to the single presentation areas and the virtual lines is a color in the third embodiment, the presentation areas may be translucent so that the driver is capable of visually recognizing the background of the presentation areas in this case. The representative information may be a shape. The shape of the single presentation area is set to, for example, a rectangle or a star shape depending on the type of the object.

As described above, the display control apparatus 100 of the third embodiment has the characteristics of the second embodiment and is characterized in that, when the position information and the size information about multiple objects are acquired in a time shorter than the attentional dwell time, the virtual lines connecting the objects are determined. Accordingly, the display control apparatus 100 achieves the advantages of the second embodiment and is capable of causing the driver to recognizing the multiple objects without causing the overlook during the attentional blink.

Fourth Embodiment

A fourth embodiment of the present disclosure will now be described. Although the "object" in the second and third embodiments means only the moving body, the "object" in the fourth embodiment includes an object fixed to the road environment, in addition to the moving body. The user of the display control apparatus 100 is the driver of a vehicle in the fourth embodiment.

Phenomena called feature search and conjunction search are known as visual features of human beings. The feature search is search in which an object having a single feature, such as a color or an orientation, is visually searched for and in which the feature is capable of being subjected to spatial parallel processing. In contrast, the conjunction search is search in which an object having multiple features, such as a color and an orientation, is visually searched for. The object is determined by paying visual attention to the object and, therefore, serial processing is performed in the conjunction search. As apparent from such phenomena, when the number of objects that are moving (hereinafter referred to as moving objects), such as pedestrians and the preceding vehicle, is increased and/or the number of objects fixed to the road environment (hereinafter referred to as fixed objects), such as a traffic signal and a road sign, is increased to reduce the ease of recognition of the foreground, it is necessary to ensure a sufficient time to successively pay attention to the multiple objects with the attentional dwell time sandwiched therebetween. The display control apparatus 100 of the fourth embodiment determines the presentation area of the object on the basis of the ease of recognition of the foreground and, if the ease of recognition of the foreground is reduced, prompts the driver to decelerate the own vehicle by audio or the like to ensure the time when the driver pays attention, thus causing the driver to more reliably recognize the multiple objects.

The block diagram illustrating an exemplary configuration of a video system according to the fourth embodiment is the same as that of the first embodiment illustrated in FIG. 1. Referring to FIG. 1, the video system 10 includes the display control apparatus 100, the display source 400, and the recognition unit 200. The display control apparatus 100 includes the determination unit 101 and the control unit 102, as in the first embodiment. The operations of the recognition unit 200 and the display source 400 are same as those in the first embodiment.

An exemplary operation of the display control apparatus 100 of the fourth embodiment will now be described. FIG. 15 is a flowchart illustrating an exemplary operational process of the display control apparatus 100 of the fourth embodiment.

Figure 16:
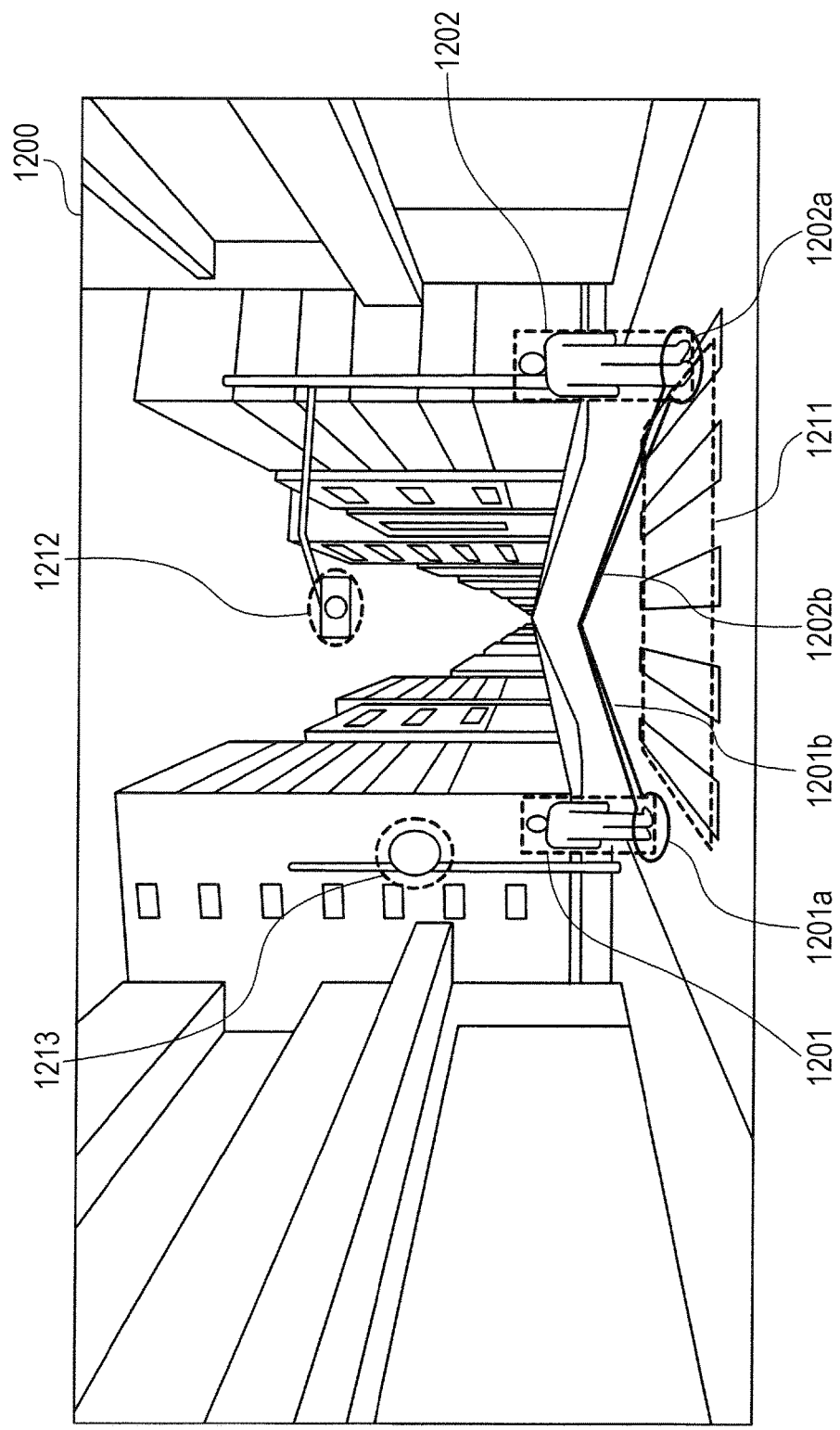
FIG. 16 illustrates an example of a foreground in the information presentation in the information presentation apparatus according to the fourth embodiment of the present disclosure.

An example of the foreground illustrated in FIG. 16 is used in the description of the exemplary operation.

For example, a road, buildings, and pedestrians walking on both sides of the road exist in a foreground 1200 in FIG. 16 as a scene on the front side of the vehicle. Referring to FIG. 16, a frame 1201 indicates the position and the size of a pedestrian (an example of the first object) who is walking on the left side in the traveling direction of the vehicle and a frame 1202 indicates the position and the size of a pedestrian (an example of the second object) who is walking on the right side in the traveling direction of the vehicle (refer to rectangles in FIG. 16). The pedestrians are examples of the moving objects.

Referring to FIG. 16, a frame 1211 indicates the position and the size of a cross-walk, a frame 1212 indicates the position and the size of a traffic signal, and a frame 1213 indicates the position and size of a traffic sign (refer to ellipsis and a trapezoid drawn with broken lines in FIG. 16). The cross-walk, the traffic signal, and the traffic sign are examples of the fixed objects.

Although a single presentation area 1201*a* corresponding the first object, a single presentation area 1202*a* corresponding to the second object, and virtual lines 1201*b* and 1202*b* connecting the position of the first object to the position of the second object are illustrated in FIG. 16 for convenience, in addition to the above frames, the single presentation area 1201*a*, the single presentation area 1202*a*, and the virtual lines 1201*b* and 1202*b* are displayed after Step S1107 in FIG. 15 described below.

The flowchart illustrating the exemplary operational process of the display control apparatus 100 of the fourth embodiment in FIG. 15 will now be described in detail.

Referring to FIG. 15, in Step S1101, the determination unit 101 acquires the position information and the size information about each of the fixed objects and the moving objects from the recognition unit 200. For example, in the case of the foreground 1200, the frames 1201 and 1202 are acquired as the position information and the size information about the moving objects and the frames 1211, 1212, and 1213 are acquired as the position information and the size information about the fixed objects.

In Step S1102, the determination unit 101 calculates the sum of the numbers of the objects the position information and the size information of which are acquired and the sum of the sizes (areas) of the objects the position information and the size information of which are acquired. For example, in the case of the foreground 1200, since the frames that are acquired are the five frames 1201, 1202, 1211, 1212, and 1213, the sum of the numbers of the objects is five. For example, in the case of the foreground 1200, the sum of the areas of the five frames 1201, 1202, 1211, 1212, and 1213 that are acquired is equal to the sum of the sizes of the objects.

In Step S1103, the determination unit 101 determines whether the sum of the numbers of the objects is smaller than a certain number. If the determination unit 101 determines that the sum of the numbers of the objects is greater than or equal to the certain number (NO in Step S1103), the process goes to Step S1105. The driver is in a state in which it is difficult for the driver to recognize the objects in the foreground when the sum of the numbers of the objects is greater than or equal to the certain number. If the determination unit 101 determines that the sum of the numbers of the objects is smaller than the certain number (YES in Step S1103), the process goes to Step S1104. The driver is in a state in which it is easy for the driver to recognize the objects in the foreground when the sum of the numbers of the objects is smaller the certain number.

In Step S1104, the determination unit 101 determines whether the sum of the sizes of the objects is smaller than a certain size. If the determination unit 101 determines that the sum of the sizes of the objects is greater than or equal to the certain size (NO in Step S1104), the process goes to Step S1105. The driver is in the state in which it is difficult for the driver to recognize the objects in the foreground when the sum of the sizes of the objects is greater than or equal to the certain size. If the determination unit 101 determines that the sum of the sizes of the objects is smaller than the certain size (YES in Step S1104), the process goes to Step S1106. The driver is in the state in which it is easy for the driver to recognize the objects in the foreground when the sum of the sizes of the objects is smaller the certain size.

In Step S1105, since the driver is in the state in which it is difficult for the driver to recognize the objects in the foreground, the determination unit 101 does not determine the presentation area and determines audio deceleration guidance. In this case, for example, audio to prompt the driver to decelerate the vehicle is output from a speaker (not illustrated).

In Step S1106, the determination unit 101 determines the connected presentation areas including the virtual lines and the single presentation area, such as the one described above in Step S805 in FIG. 12. Since the detailed description of Step S1106 has been given in Step S504 in FIG. 9 and Step S806 in FIG. 12, the description is omitted herein. In this case, for example, the single presentation area 1201a corresponding to the first object, the single presentation area 1202a corresponding to the second object, and the virtual lines 1201b and 1202b connecting the position of the first object to the position of the second object are displayed in the foreground 1200 in FIG. 16. Although the example of the presentation in FIG. 16 is the same as those in FIG. 14B and FIG. 14C in the third embodiment, the presentation is not limited to the above one. Any of the examples of the presentation in FIG. 11A to FIG. 11D in the second embodiment may be used.

Since Step S1107 is the same as Step S505 in FIG. 9 and Step S807 in FIG. 12, the description of Step S1107 is omitted herein.

Although the ease of recognition of the foreground is determined on the basis of the number and the sizes of the objects in the fourth embodiment, the determination of the ease of recognition of the foreground is not limited to this. For example, the ease of recognition of the foreground may be determined on the basis of, for example, the colors, the shapes, or the moving directions of the objects.

Although the sum of the number of the fixed objects and the number of the moving objects is used in the fourth embodiment, either of the number of the fixed objects and the number of the moving objects may be used or the objects may be weighted depending on the sizes of the objects. Although the cross-walk, the traffic signal, and the traffic sign are used as the fixed objects, a combination of any one kind or multiple kinds of the cross-walk, the traffic signal, and the traffic sign may be used. The fixed objects may include, for example, a curved mirror, a utility pole, and a signboard, in addition to the cross-walk, the traffic signal, and the traffic sign.

Although the total number of the sum of the sizes of the fixed objects and the sum of the sizes of the moving objects is used in the fourth embodiment, the total number of the sum of the sizes of the fixed objects and the sum of the sizes of the moving objects is not limitedly used. For example, the sum of the sizes of either of the fixed objects and the moving objects may be used or the objects may be weighted depending on the kinds or the approach speeds of the objects.

Although the presentation area is not determined and the audio deceleration guidance is performed in the fourth embodiment, the audio deceleration guidance may be performed, in addition to the display of the presentation area. Alternatively, a color or the like indicating the status in which the foreground is difficult to be recognized may be added to the presentation area. Assistance other than the audio assistance or assistance other than the deceleration guidance may be performed.

As described above, the display control apparatus 100 of the fourth embodiment has the characteristics of the second and third embodiments and is characterized in that the virtual lines (including the single presentation area) are presented when it is easy for the driver to recognize the foreground and the audio deceleration guidance is performed when it is difficult for the driver to recognize the foreground. Accordingly, the display control apparatus 100 achieves the advantages of the second and third embodiments and is capable of ensuring the time in which the driver pays attention and causing the driver to reliably recognize the multiple objects to which attention should be paid without requiring the sight line shift.

Although the first to fourth embodiments of the present disclosure are described above with reference to the drawings, the function of each component in the apparatuses described above may be realized by a computer program.

Figure 17:
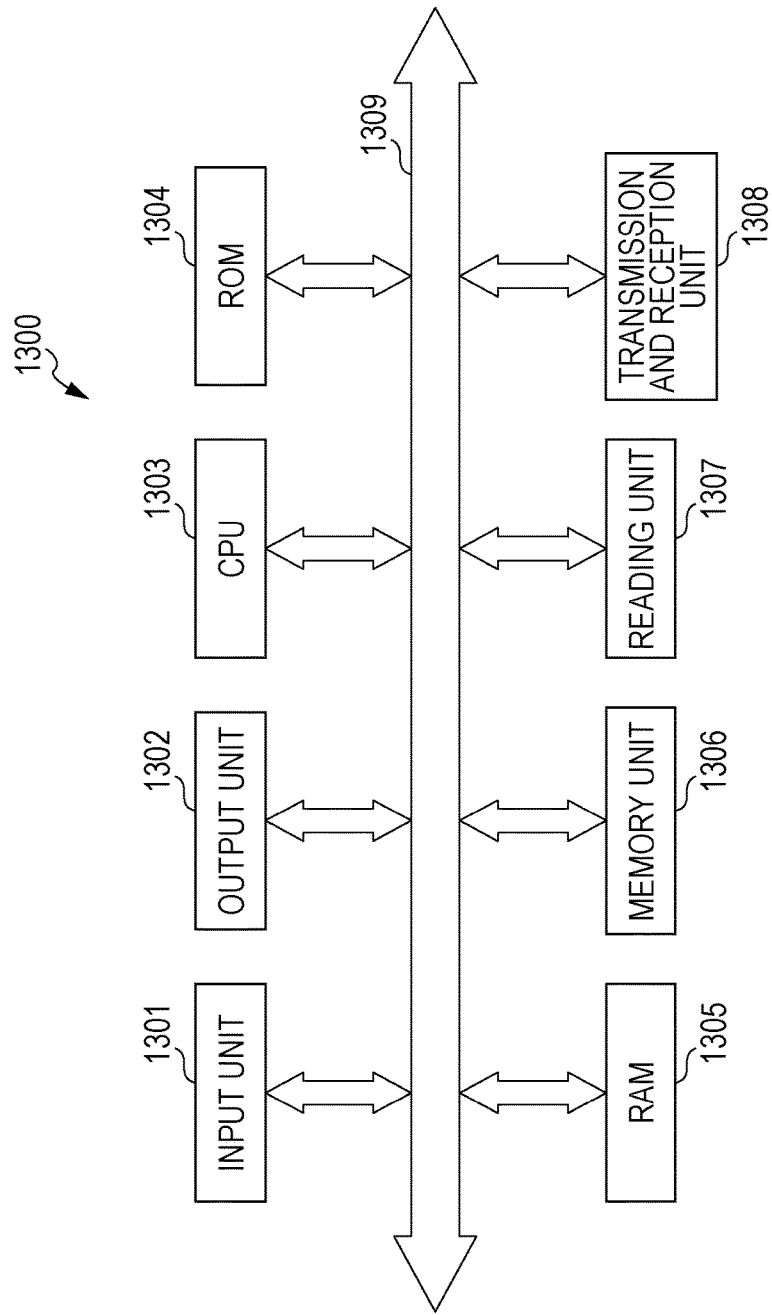
FIG. 17 is a block diagram illustrating an exemplary hardware configuration of the information presentation apparatuses according to the first to fourth embodiments of the present disclosure.

FIG. 17 is a block diagram illustrating an exemplary hardware configuration of a computer, which realizes the function of each communication using the program. Referring to FIG. 17, a computer 1300 includes an input unit 1301, such as a keyboard, a mouse, and/or a touch pad; an output unit 1302 such as a display and/or a speaker; a central processing unit (CPU) 1303; a read only memory (ROM) 1304; a random access memory (RAM) 1305; a memory unit 1306 such as a hard disk device or a solid state drive (SSD); a reading unit 1307 that reads information from a recording medium, such as a digital versatile disk-read only memory (DVD-ROM) or a universal serial bus (USB) memory; and a transmission and reception unit 1308 that performs communication via a network. The above components are connected to each other via a bus 1309.

The reading unit 1307 reads out the program from the recording medium in which the program for realizing the function of each component is recorded and stores the program in the memory unit 1306. Alternatively, the transmission and reception unit 1308 communicates with a server apparatus connected to the network to store the program for realizing the function of each component, which is downloaded from the server apparatus, in the memory unit 1306.

The CPU 1303 copies the program stored in the memory unit 1306 into the RAM 1305 and sequentially reads out instructions included in the program from the RAM 1305 for execution to realize the function of each component. In the execution of the program, the pieces of information resulting from the various processes described in the above embodiments are stored in the RAM 1305 and the memory unit 1306 and are appropriately used.

The program to be executed in the above components may be recorded in a portable computer-readable recording medium (for example, a DVD, a USB memory, a memory card, or the like) in an installable-format file or an executable-format file for provision. Alternatively, the program may be stored in a computer connected to a network, such as the Internet, and may be downloaded to a terminal via the network. Alternatively, the program may be incorporated into a storage unit (for example, a ROM) in the terminal in advance for provision.

The present disclosure is not limited to the first to fourth embodiments of the present disclosure described above, and various changes and modifications may be made to the present disclosure without departing from the spirit and scope thereof.

For example, although the example is described in the above embodiments in which the user who visually recognizes the presentation areas is the driver of the vehicle, the user may be a pedestrian. For example, the user may be walking (or running) while wearing the video system 10 on which the HMD is mounted to achieve the advantages described in the above embodiments.

The present disclosure is useful for technologies concerning, for example an information presentation apparatus, an information presentation method, an information presentation program, and a projection apparatus, which present information for alerting the driver of a vehicle.

What is claimed is:

1. A method for a video system including recognition circuitry that recognizes one or more moving bodies existing on a front side of a vehicle that a user drives, and a display source that displays a certain image generated on the basis of a result of the recognition by the recognition circuitry on a display, the method comprising:
    determining whether the one or more moving bodies includes two or more moving bodies that exist on the front side of the vehicle on the basis of input data from the recognition circuitry;
    controlling the display source, when it is determined that two or more moving bodies exist on the front side of the vehicle, so as to generate the certain image representing one or more virtual lines connecting the corresponding two or more moving bodies from a certain point; and
    displaying the generated certain image on the display,
    wherein a position of the certain point is changed on the basis of a status of the front side of the vehicle included in the result of the recognition,
    wherein the status of the front side of the vehicle is that a preceding vehicle exists or not on the front side of the vehicle, and
    wherein, when the preceding vehicle is on the front side of the vehicle, the position of the certain point is changed not to overlap with the preceding vehicle.

2. The method according to claim 1, further comprising:
    when it is determined that a new moving body exists on the front side of the vehicle on the basis of an input data from the recognition circuitry, the display source is controlled so as to generate the certain image representing a virtual line connecting the new moving body from the certain point and display the generated certain image on the display.

3. The method according to claim 1, further comprising:
    when it is determined that at least one moving body, among the two or more moving bodies, disappears from the front side of the vehicle on the basis of an input data from the recognition circuitry, the display source is controlled so as to generate the certain image in which at least one virtual line included in the one or more virtual lines connected with the corresponding at least one moving body that is determined to disappear from the front side of the vehicle is deleted and display the generated certain image on the display.

4. The method according to claim 1,
    wherein a thickness of each of the one or more virtual lines is determined on the basis of at least one of a distance from the vehicle to the corresponding moving body, a speed of the vehicle, and a relative speed between the corresponding vehicle and any one of the one or more moving bodies.

5. The method according to claim 1,
    wherein the video system includes a camera that detects at least one of an orientation and a line of sight of the user, and
    wherein the method further includes determining the position of the certain point on the basis of the orientation and the line of sight detected by the camera.

6. The method according to claim 1,
    wherein, when it is determined that two or more moving bodies exist, the display source is controlled so as to generate the certain image that represents the one or more virtual lines connecting each of the corresponding two or more moving bodies from the certain point and the certain image that represents a virtual graphic of a certain shape at a position corresponding to each of the two or more moving bodies and display the generated certain images on the display.

7. A display control apparatus in a video system including recognition circuitry that recognizes one or more moving bodies existing on a front side of a vehicle that a user drives, and a display source that displays a certain image generated on the basis of a result of the recognition by the recognition circuitry on a display, the display control apparatus comprising:
    determination circuitry that determines whether the one or more moving bodies includes two or more moving bodies that exist on the front side of the vehicle on the basis of input data from the recognition circuitry; and
    a controller that, when the determination circuitry determines that the two or more moving bodies exist on the front side of the vehicle, controls the display source so as to generate the certain image representing one or more virtual lines connecting each of the corresponding two or more moving bodies from a certain point, and so as to display the generated certain image on the display,
    wherein the controller changes a position of the certain point on the basis of a status of the front side of the vehicle included in the result of the recognition,
    wherein the status of the front side of the vehicle is that a preceding vehicle exists or not on the front side of the vehicle, and
    wherein, when the preceding vehicle is on the front side of the vehicle, the controller changes the position of the certain point not to overlap with the preceding vehicle.

8. The display control apparatus according to claim 7,
    wherein, when the determination circuitry determines that a new moving body exists on the front side of the vehicle on the basis of an input data from the recognition circuitry, the controller controls the display source so as to generate the certain image representing a new virtual line connecting the new moving body from the certain point and display the generated certain image on the display.

9. The display control apparatus according to claim 7,
    wherein, when the determination circuitry determines that at least one moving body, among the two or more moving bodies, disappears from the front side of the vehicle on the basis of input data from the recognition circuitry, the controller controls the display source so as to generate the certain image in which at least one virtual line included in the one or more virtual lines connected with the corresponding at least one moving body that is determined to disappear from the front side of the vehicle is deleted and display the generated certain image on the display.

10. The display control apparatus according to claim 7,
    wherein a thickness of each of the one or more virtual lines is determined on the basis of at least one of a distance from the vehicle to the corresponding moving body, a speed of the vehicle, and a relative speed between the corresponding vehicle and any one of the moving bodies.

11. The display control apparatus according to claim 7,
wherein the video system includes a camera that detects at least one of an orientation and a line of sight of the user, and
wherein the controller determines the position of the certain point on the basis of the orientation and the line of sight detected by the camera.

12. The display control apparatus according to claim 7, wherein, when the determination circuitry determines that two or more moving bodies exist, the controller controls the display source so as to generate the certain image that represents the one or more virtual lines connecting the corresponding two or more moving bodies from the certain point and the certain image that represents a virtual graphic of a certain shape at a position corresponding to each of the two or more moving bodies and display the generated certain images on the display.

13. A vehicle, comprising:
the display control apparatus according to claim 7.

14. A non-transitory, tangible computer-readable recording medium recording a display control program causing a computer in a video system including recognition circuitry that recognizes one or more moving bodies existing on a front side of a vehicle that a user drives, and a display source that displays a certain image generated on the basis of a result of the recognition by the recognition circuitry on a display to execute:
determining whether the one or more moving bodies includes two or more moving bodies that exist on the front side of the vehicle on the basis of input data from the recognition circuitry;
controlling the display source, when it is determined that two or more moving bodies exist on the front side of the vehicle, so as to generate the certain image representing one or more virtual lines connecting each of the corresponding two or more moving bodies from a certain point, and so as to display the generated certain image on the display,
wherein changing a position of the certain point is performed on the basis of a status of the front side of the vehicle included the result of the recognition,
wherein the status of the front side of the vehicle is that a preceding vehicle exists or not on the front side of the vehicle, and
wherein, when the preceding vehicle is on the front side of the vehicle, changing the position of the certain point not to overlap with the preceding vehicle.

15. A display control apparatus, comprising:
first connecting circuitry connected to recognition circuitry that recognizes one or more moving bodies existing on the front side of a vehicle that a user drives:
second connecting circuitry connected to a display source that displays a certain image generated on the basis of a result of the recognition by the recognition circuitry on a display;
determination circuitry that determines whether the one or more moving bodies includes two or more moving bodies that exist on the front side of the vehicle on the basis of input data from the recognition circuitry; and
a controller that, when the determination circuitry determines that the two or more moving bodies exist on the front side of the vehicle, controls the display source so as to generate the certain image representing one or more virtual lines connecting each of the corresponding two or more moving bodies from a certain point, and displays the generated certain image including the one or more virtual lines connecting each of the corresponding two or more moving bodies on the display,
wherein the controller changes a position of the certain point on the basis of a status of the front side of the vehicle included the result of the recognition,
wherein the status of the front side of the vehicle is that a preceding vehicle exists or not on the front side of the vehicle, and
wherein, when the preceding vehicle is on the front side of the vehicle, the controller changes the position of the certain point not to overlap with the preceding vehicle.

* * * * *